US 12,475,160 B2

(12) United States Patent
Kutty

(10) Patent No.: US 12,475,160 B2
(45) Date of Patent: Nov. 18, 2025

(54) ARTIFICIALLY INTELLIGENT GENERATION OF PERSONALIZED TEAM AUDIOVISUAL COMPILATION

(71) Applicant: Oracle International Corporation, Redwood Shores, CA (US)

(72) Inventor: Arun Kutty, Amsterdam (NL)

(73) Assignee: Oracle International Corporation, Redwood Shores, CA (US)

( * ) Notice: Subject to any disclaimer, the term of this patent is extended or adjusted under 35 U.S.C. 154(b) by 168 days.

(21) Appl. No.: 18/545,820

(22) Filed: Dec. 19, 2023

(65) Prior Publication Data

US 2025/0200104 A1  Jun. 19, 2025

(51) Int. Cl.
  *G06F 16/438* (2019.01)
  *G06F 16/3329* (2025.01)

(52) U.S. Cl.
  CPC ...... *G06F 16/4393* (2019.01); *G06F 16/3329* (2019.01)

(58) Field of Classification Search
  None
  See application file for complete search history.

(56) References Cited

U.S. PATENT DOCUMENTS

| | | | |
|---|---|---|---|
| 12,158,929 B1 * | 12/2024 | Huang | H04L 9/0643 |
| 2007/0101394 A1 * | 5/2007 | Fu | H04N 21/42646 |
| | | | 348/E7.071 |
| 2011/0161997 A1 * | 6/2011 | Rourk | H04N 21/812 |
| | | | 725/5 |
| 2012/0134248 A1 * | 5/2012 | Spitzlinger | G11B 20/00427 |
| | | | 369/47.12 |
| 2019/0087707 A1 * | 3/2019 | Cummins | G06F 16/3329 |
| 2021/0089507 A1 * | 3/2021 | Prasad | G06F 16/2255 |
| 2023/0401789 A1 * | 12/2023 | Shang | H04S 7/302 |

OTHER PUBLICATIONS zapier.com, "The best AI video generators in 2023"; https://zapier.com/blog/best-ai-video-generator.

* cited by examiner

*Primary Examiner* — Toan H Vu
(74) *Attorney, Agent, or Firm* — Mughal Gaudry & Franklin PC

(57) ABSTRACT

An audiovisual compilation tool is provided for generating a customized and personalized audiovisual compilation. The audiovisual compilation tool receives a request that specifies a purpose and team. Based on the request, the audiovisual compilation personalization tool accesses a candidate viewer data structure to identify candidate viewers on the specified team. The audiovisual compilation tool creates a customized audiovisual compilation based on items of audiovisual content labeled for the specified purpose and based on aggregate characteristics of the candidate viewers. The customized audiovisual compilation is personalized by substituting audible names for different candidate viewers in marked sections of audio from the selected audiovisual content, and blending the marked sections with surrounding audio content. Tracked feedback questions specific to content in the audiovisual compilation may be automatically generated and inserted into the audiovisual compilation, and overlayed graphical elements may be added to trigger external functionality from within the audiovisual compilation.

20 Claims, 9 Drawing Sheets

ARTIFICIALLY INTELLIGENT GENERATION OF PERSONALIZED TEAM AUDIOVISUAL COMPILATION

BACKGROUND

Companies offer training videos to employees for a variety of reasons, and these training videos are often dull and impersonal due to the broad audience the training videos intend to serve. Many videos involve high-level company officials, such as the CEO or CTO, and the company cannot afford to have the such high-level company officials personally train each employee. As a result, these dull and impersonal videos are the primary source of standardized training at large companies.

These companies also cannot just create training videos that are edgier and more targeted, as such videos would not serve the purpose of the entire audience intended to view the training videos. As a result, broad training has limited impact in these large companies.

BRIEF SUMMARY

An audiovisual compilation tool is provided for generating a customized and personalized audiovisual compilation. The audiovisual compilation tool receives a request that specifies a purpose and team. Based on the request, the audiovisual compilation personalization tool accesses a candidate viewer data structure to identify candidate viewers on the specified team. The audiovisual compilation tool creates a customized audiovisual compilation based on items of audiovisual content labeled for the specified purpose and/or based on aggregate characteristics of the candidate viewers. The customized audiovisual compilation is personalized by substituting audible names for different candidate viewers in marked sections of audio from the selected audiovisual content, and blending the marked sections with surrounding audio content. Tracked feedback questions specific to content in the audiovisual compilation may be automatically generated and inserted into the audiovisual compilation, and overlayed graphical elements may be added to trigger external functionality from within the audiovisual compilation.

In some embodiments, a computer-implemented method includes storing a plurality of items of audiovisual content. Each item of audiovisual content of the plurality of items of audiovisual content is labeled with a content label of a plurality of content labels. The computer-implemented method further includes receiving a request to generate a compilation of audiovisual content for a specified purpose and a specified team. A candidate viewer data structure is analyzed to determine a plurality of candidate viewers on the specified team, and, for each candidate viewer of the plurality of candidate viewers on the specified team, a profile of said candidate viewer is analyzed to determine one or more characteristics of said candidate viewer. The one or more characteristics of said each candidate viewer on the specified team may be aggregated to determine one or more team characteristics.

From a plurality of content labels, the computer-implemented method determines a first set of one or more content labels associated with a specified purpose and a second set of one or more content labels associated with the one or more team characteristics. A particular plurality of items of audiovisual content for the compilation are selected such that the particular plurality of items of audiovisual content include one or more items of audiovisual content having at least one content label of the first set of one or more content labels, and one or more other items of audiovisual content having at least one content label of the second set of one or more content labels. A particular item of audiovisual content of the particular plurality of items of audiovisual content comprises a marked section of audio content reserved for a variable candidate viewer's audible name.

For a first candidate viewer of the plurality of candidate viewers on the specified team, the computer-implemented method automatically generates a first customized compilation based on the particular plurality of items. The first customized compilation comprises a first customized version of the particular item of audiovisual content generated at least in part by substituting an audible name of the first candidate viewer as the variable candidate viewer's audible name in the marked section of audio content to generate a first marked section, and blending the first marked section with the particular item of audiovisual content.

For a second candidate viewer of the plurality of candidate viewers on the specified team, the computer-implemented method automatically generates a second customized compilation based on the particular plurality of items. The second customized compilation comprises a second customized version of the particular item of audiovisual content generated at least in part by substituting an audible name of the second candidate viewer as the variable candidate viewer's audible name in the marked section of audio content to generate a second marked section, and blending the second marked section with the particular item of audiovisual content.

In a further embodiment, the computer-implemented method includes receiving the particular item of audiovisual content without the marked section of audio content. The computer-implemented method then transforms the particular item of audiovisual content into a particular item of text content, extracts one or more vector embeddings from the particular item of text content, and inputs the one or more vector embeddings from the particular item of text content to a machine learning model for identifying a placeholder for a candidate viewer name in a corpus of text. For a particular placeholder identified by the machine learning model from the one or more vector embeddings, the computer-implemented method further includes determining a corresponding start time and a corresponding end time in the particular item of audiovisual content, and marking the particular item of audiovisual content based on the corresponding start time and the corresponding end time, resulting in the marked section of audio content reserved for the variable candidate viewer's audible name.

One or more machine learning models may be used to select the particular plurality of items of audiovisual content for the compilation. In one embodiment, a machine learning model is used for matching different purposes of a plurality of candidate purposes with different labeled audiovisual content items, at least in part by matching the specified purpose with at least one content label of the first set of one or more content labels. In another embodiment, a machine learning model is used for matching different team characteristics of a plurality of candidate team characteristics with different labeled audiovisual content items, at least in part by matching the one or more team characteristics with at least one content label of the second set of one or more content labels.

The audio may be personalized by blending the first marked section with the particular item of audiovisual content. In one embodiment, this blending includes extracting a first set of vector embeddings that include one or more section volume metrics, one or more section frequency metrics, and one or more section noise metrics from the first marked section and a second set of vector embeddings that include one or more item volume metrics, one or more item frequency metrics, and one or more item noise metrics from the particular item of audiovisual content. The blending further includes inputting the first set of vector embeddings, the second set of vector embeddings, and the first marked section of audio content into a machine learning model for blending audio content with surrounding audio. Then, based on an output of the machine learning model, the blending includes modifying the first marked section so at least one of the one or more section volume metrics, at least one of the one or more section frequency metrics, and at least one of the one or more section noise metrics are more aligned with at least one of the one or more item volume metrics, at least one of the one or more item frequency metrics, and at least one of the one or more item noise metrics.

A selected item of audiovisual content may be enriched to add one or more questions. In one embodiment, the computer-implemented method includes transforming a selected item of the particular plurality of items of audiovisual content into a particular item of text content. One or more vector embeddings may be extracted from the particular item of text content and input to a machine learning model for generating a feedback question relevant to a corpus of text. For a particular feedback question generated by the machine learning model from the one or more vector embeddings, the computer-implemented method includes causing display, on a content enrichment interface, of the particular feedback question and an option to add the particular feedback question to the selected item of audiovisual content. The option to add the particular feedback question to the selected item of audiovisual content, when selected, causes embedding, in the selected item of audiovisual content, a script for handling an answer to the particular feedback question via a viewer interface by storing the answer, when provided, in a data structure modifiable by the viewer interface and accessible to the content enrichment interface.

The questions may be refreshed using a machine learning model. In one embodiment, the computer-implemented method includes transforming a selected item of the particular plurality of items of audiovisual content into a particular item of text content, extracting one or more vector embeddings from the particular item of text content, and inputting the one or more vector embeddings from the particular item of text content to the machine learning model for generating a feedback question relevant to a corpus of text. For a particular feedback question generated by the machine learning model from the one or more vector embeddings, the method further includes causing display, on a content enrichment interface, of the particular feedback question, an option to add the particular feedback question to the selected item of audiovisual content, and an option to change the particular feedback question. The option to change the particular feedback question, when selected, causes input of the one or more vector embeddings and additional metadata to the machine learning model. The additional metadata indicates that the particular feedback question is not allowable output. For a new feedback question generated by the machine learning model from the one or more vector embeddings and the additional metadata, the computer-implemented method further includes causing display, on a content enrichment interface, of the new feedback question, an option to add the new feedback question to the selected item of audiovisual content, and an option to change the new feedback question. The new feedback question is different from the particular feedback question.

A selected item of audiovisual content may alternatively or additionally be enriched with visual content. In one embodiment, the computer-implemented method includes causing display, on a content enrichment interface, of an option to modify visual content of a selected item of the particular plurality of items of audiovisual content according to one or more given characteristics associated with a given candidate viewer. The option to modify visual content, when selected, causes a sample change to particular visual content of the particular item of audiovisual content for view in the content enrichment interface. A prompt template is generated that, when applied to the one or more given characteristics, transforms the one or more given characteristics into a prompt specific to the one or more given characteristics. After the option to modify visual content is committed via the content enrichment interface, the option further causes, when an individual candidate viewer is an active viewer in a viewer interface, accessing a particular profile of the individual candidate viewer to determine one or more particular characteristics associated with the individual candidate viewer. For the active viewer, a particular prompt is generated specific to the candidate viewer based at least in part on the prompt template. The prompt template transforms the one or more particular characteristics to the particular prompt. The computer-implemented method further includes inputting one or more vector embeddings from candidate visual content, one or more frames of the candidate visual content, and the particular prompt, to a machine learning model for modifying the candidate visual content based on text prompts, and, based on output from the machine learning model, modifying one or more frames of the candidate visual content. The one or more modified frames account for the one or more particular characteristics. The one or more modified frames may then be displayed in the viewer interface.

In one embodiment, a content enrichment interface displays an option to overlay interactive content on a selected item of the particular plurality of items of audiovisual content. The option to overlay interactive content, when selected, causes one or more graphical elements to appear on top of the selected item when the selected item is viewed by an active candidate viewer in a viewer interface. Selection of a first graphical element of the one or more graphical elements, from the viewer interface, causes an operation to be performed outside of the viewer interface. The operation causes a downstream communication to the active candidate viewer outside of the viewer interface based at least in part on information from a particular profile of the active candidate viewer.

In various aspects, a system is provided that includes one or more data processors and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

An audiovisual compilation tool generates a customized and personalized audiovisual compilation. The audiovisual compilation tool creates a customized audiovisual compilation based on items of audiovisual content labeled for a specified purpose and/or based on aggregate characteristics of candidate viewers. The customized audiovisual compilation is personalized by substituting audible names for different candidate viewers in marked sections of audio from the selected audiovisual content, and blending the marked sections with surrounding audio content.

The audiovisual compilation tool is described as a computer-implemented process or method for receiving input via a user interface and generating the audiovisual compilation. In various embodiments, the audiovisual compilation tool is implemented using non-transitory computer-readable storage media to store instructions which, when executed by one or more processors of a computer system, cause display of the user interface and processing of the received input to generate the audiovisual compilation. The audiovisual compilation tool may be implemented on a local or cloud-based computer system that includes processors and a display for showing the user interface to a user of the audiovisual compilation tool, or "content orchestrator." The computer system may communicate with candidate viewer computer systems for displaying the customized and personalized audiovisual compilations to users of the candidate viewer computer systems, or "candidate viewers."

A description of the audiovisual compilation tool and corresponding processes is provided in the following sections:
STORING AND PREPARING AUDIOVISUAL CONTENT
STORING AND PREPARING CANDIDATE VIEWER DATA
AUTHENTICATING A USER TO AN INDIVIDUALIZED AUDIVISUAL COMPILATION ENVIRONMENT
AUDIOVISUAL CONTENT CUSTOMIZATION PORTAL
AUDIOVISUAL CONTENT ENRICHMENT PORTAL
CUSTOMIZED TRACKED FEEDBACK QUESTIONS
CUSTOMIZED ADDITIONS OF GRAPHICAL ELEMENTS
ARTIFICIALLY INTELLIGENT AUDIOVISUAL CONTENT PERSONALIZATION
PERSONALIZED AUDIOVISUAL CONTENT VIEWING PORTAL
COMPUTER SYSTEM ARCHITECTURE The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Storing and Preparing Audiovisual Content

Figure 1:
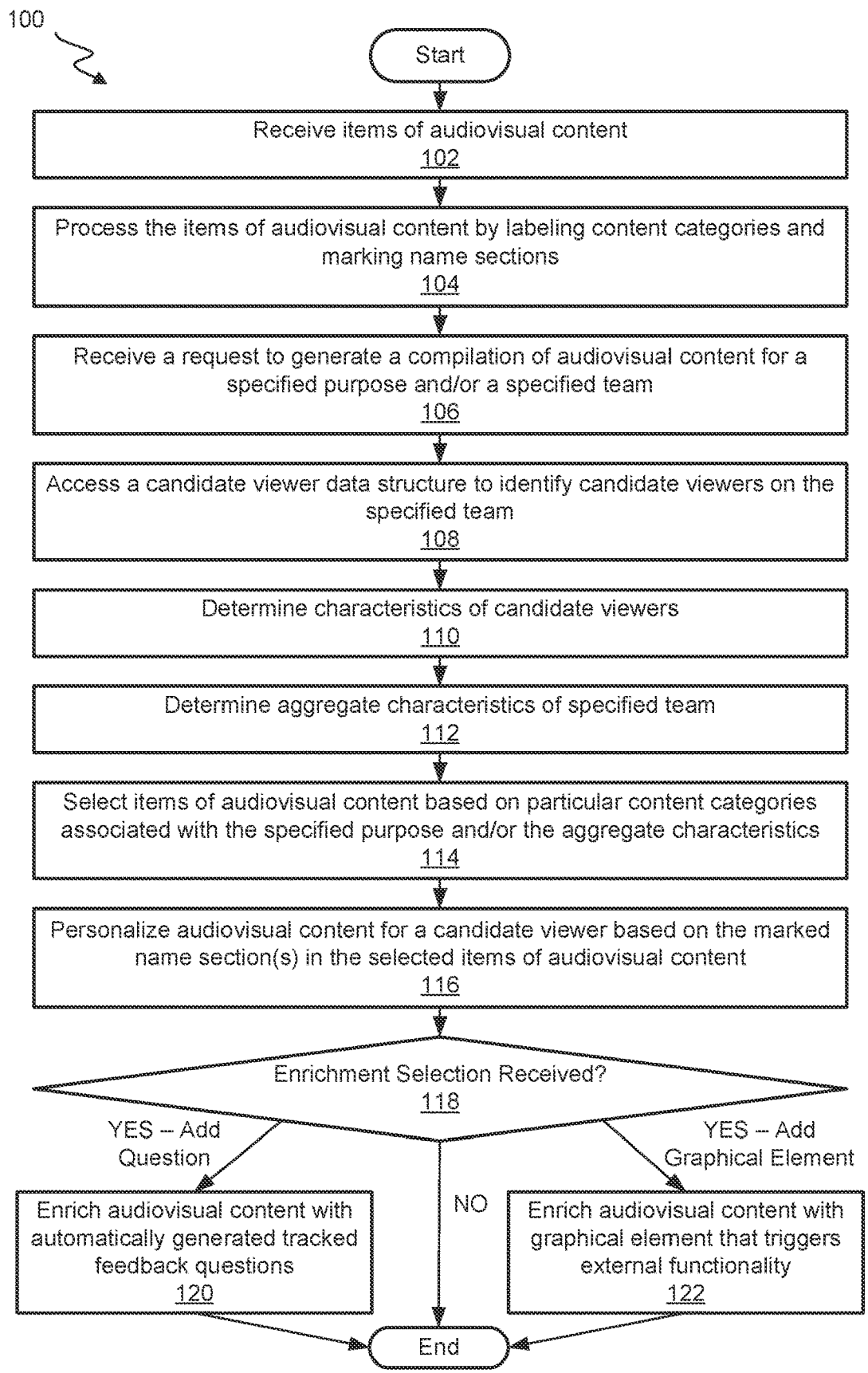
FIG. 1 is a flow chart that illustrates an example process for customizing and personalizing an audiovisual content compilation.

FIG. 1 is a flow chart of an example process 100 for customizing and personalizing an audiovisual content compilation. As shown, process 100 begins with block 102, where items of audiovisual content are received. These items may be received in a content storage and processing interface that allows a user to upload items of audiovisual content by selecting the items of audiovisual content from local sources on her/his machine, or from sources accessible via the Internet or an audiovisual content cloud. Once an item of audiovisual content is selected for upload by the user, an audiovisual content processing tool, for example, running in a cloud environment, may perform processing on the item synchronously or asynchronously with the item's upload and storage in a cloud audiovisual content repository. In block 104 of process 100, the audiovisual content processing tool processes the items of audiovisual content by labeling content categories and marking name selections in the items of audiovisual content.

Figure 6:
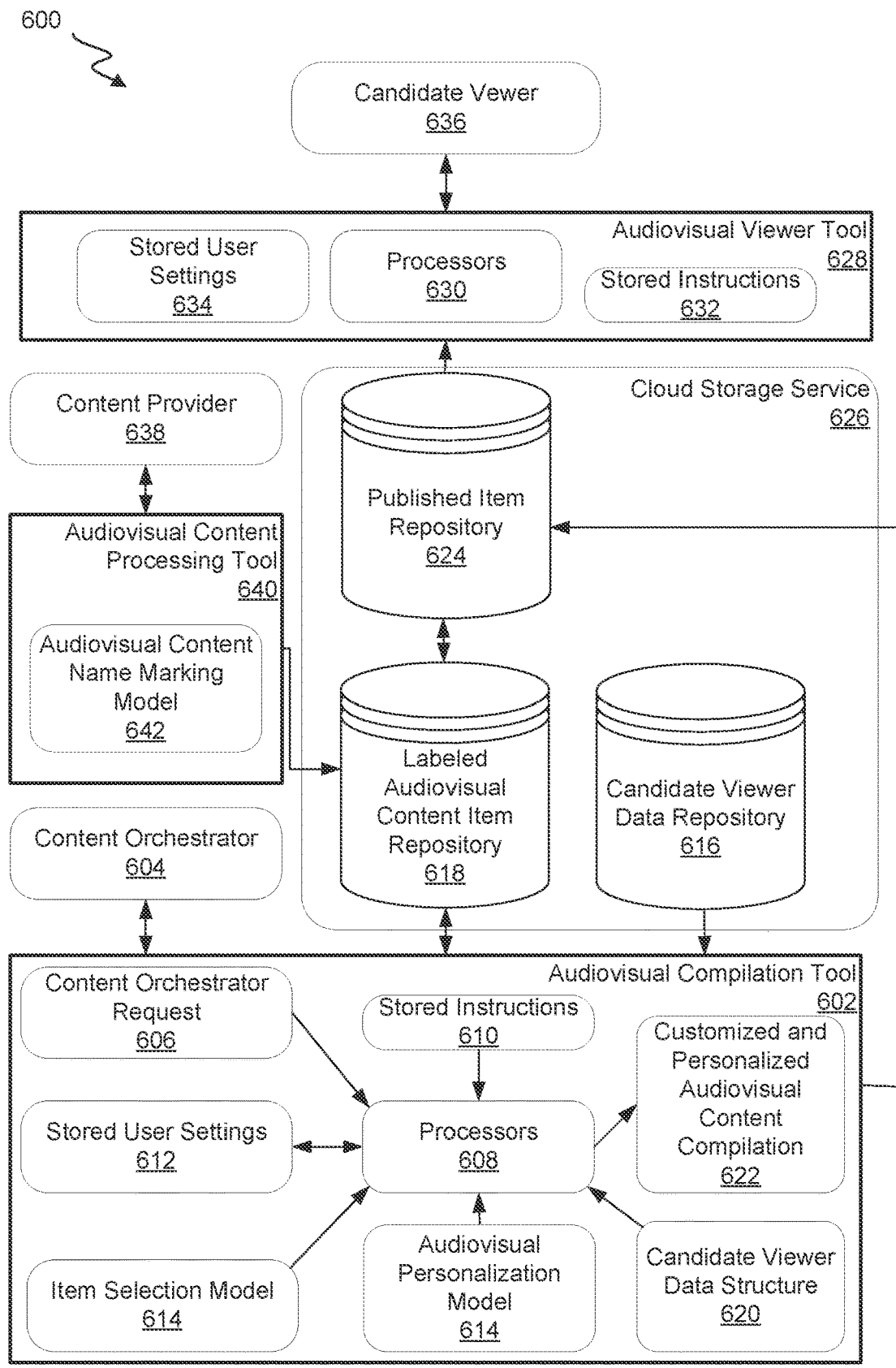
FIG. 6 is a diagram that illustrates an example system for customizing and personalizing an audiovisual content compilation.

FIG. 6 depicts diagram of a system for customizing and personalizing an audiovisual content compilation. As shown, content provider 638 interacts with audiovisual content processing tool 640, which may include processor(s), stored instruction(s), and user setting(s) sufficient to receive uploaded audiovisual content items. Audiovisual content processing tool 640 also includes audiovisual content name marking model 642, which is an a machine learning model trained on identifying names within audiovisual content.

Audiovisual content name marking model 642 may have access to a dictionary of names and relative popularities of the names. The dictionary of names and relative popularities may be region-specific and/or company specific, and may take into account candidate viewer data repository 616.

Audiovisual content name marking model 642 may also incorporate a pre-trained speech-to-text model that converts audio content from the audiovisual content items into textual content. Audiovisual content name marking model 642 may receive, as inputs, a text version of the pre-trained speech to text model as well as vector embeddings from the text, or directly from audio and/or video of the audiovisual content item to be marked. The item of audiovisual content may initially be marked with all proper noun or common nouns that do not otherwise fit within a context of the words spoken in the item of audiovisual content, after filtering out action words, adjectives, adverbs, articles, numbers, and other words that are unlikely to represent a person's name. For each marked section containing a proper noun, or a "name candidate section", the vector embeddings may indicate, for example, a likelihood that the surrounding text indicates that content in a particular section is likely to be a proper name, whether the proper name is more likely to match a location or a person's name, whether the proper name is found within candidate viewer data repository 616, whether the proper name is near pronouns such as "you," or directives or commands, which indicate that the surrounding text is addressing a person, how many times the name occurs in the text, how many person names sound like the proper name, how close the proper name sounds to each matching person name, how many location names sound like the proper name, how close the proper name sounds to each matching location name, and a level of background noise indicating how seamlessly the proper name could be removed from a marked location and another name could be substituted in the marked location. Other vector embeddings are also possible to indicate the overall likelihood that a given section is a person's name.

Audiovisual content name marking model 642 may be trained on thousands of items of audiovisual content such that patterns in the vector embeddings and speech-to-text data are determined and name marking is iteratively improved with the training. Negative feedback may be provided by training users by indicating that a marked section does not contain a person's name (a false positive), or that a person's name was in the item of audiovisual content without being marked (a false negative). Positive feedback may be provided in the event that audiovisual content name marking model 642 correctly processes vector embeddings and input datasets to predict a marked location of a person's name. Such feedback may be used to adjust weights, impacts, and relationships between the vector embeddings and input data.

Once audiovisual content name marking model 642 has been used to identify person names in the input audiovisual content item, audiovisual content name marking model 642 may include a sub-model for refining marked boundaries of the person names. Audiovisual content name marking model may include an initial name marking plus vector embeddings that focus on volume levels, frequencies, and sound changes in the input audiovisual content item, as well as unique characteristics of the detected person name. These inputs to the sub-model may be used to adjust the name marking boundaries for the person names in the input audiovisual content items. The sub-model for refining the marked boundaries may also be trained on thousands of items of audiovisual content with feedback provided to indicate that the start boundary of the person's name as predicted is accurate, too early, or too late, and feedback provided to indicate that the end boundary of the person's name as predicted is accurate, too early, or too late. The sub-model may then be adjusted, with weights, impacts, and relationships between vector embeddings and input data adjusted based on the feedback.

Audiovisual content processing tool 640 may also include an option for content provider 638 to specify one or more categories for the input audiovisual content item (specified categories), and/or a content to category model for detecting content categories in the input audiovisual content item (learned categories). Audiovisual content processing tool 640 may include a speech-to-text pre-trained model for transforming the input audiovisual content item into text, and additional vector embeddings may be provided for the input text and/or the original input audio and/or video content. Text may also be detected from the video content, for example, from slides or other content that is shown on the screen during a training video. The content to category model also has access to an ontology that maps keyword clusters to corresponding categories. The content to category model may detect certain keywords in the input items of audiovisual content that are mapped, via the ontology, to certain categories, and label those items with the corresponding categories. The content to category model may be trained on the level of overlap required between individual content categories from the ontology and spoken words or content from the item of audiovisual content, with the training data indicating that some keywords in some categories (i.e., "harassment" and "bribery") require little additional support to indicate a high likelihood that a particular content category (in the example, "compliance" or "HR") is present in the audiovisual content item; whereas, other keywords in other categories (i.e., "sales" and "leads") require more support to indicate a high enough likelihood that the particular content category (i.e., "sales" or "marketing") is present in the audiovisual content item. The specified categories may also be provided as feedback to improve the content to category model over time. Based on the specified categories and/or learned categories, input items of audiovisual content are marked with corresponding content categories that predict categories or topics of content contained within the items of audiovisual content.

In one embodiment, a particular item of audiovisual content is received without any section of audio content being marked as containing a name. The audiovisual content processing tool 640 of FIG. 6 then transforms the particular item of audiovisual content into a particular item of text content, extracts vector embedding(s) from the particular item of text content, and inputs the vector embedding(s) from the particular item of text content to audiovisual content name marking model for identifying a placeholder for a candidate viewer name in a corpus of text. For a particular placeholder identified by the audiovisual content name marking model from the vector embedding(s), audiovisual content name marking model 642 determines a corresponding start time and a corresponding end time in the particular item of audiovisual content, and marks the particular item of audiovisual content based on the corresponding start time and the corresponding end time, resulting in the marked section of audio content reserved for the variable candidate viewer's audible name.

Storing and Preparing Candidate Viewer Data

As shown in FIG. 6, candidate viewer data repository 616 may be stored in a cloud storage service 626, accessible to audiovisual compilation tool 602 which may also operate in the cloud or may operate on premises of a company by pushing content to the cloud. In one example, candidate viewer data includes data about employees of a company as well as metadata indicating a hierarchy or organizational structure of the employees within the company. The people represented in candidate viewer data repository 616 may be organized into teams, and those teams may hierarchically report to other teams, up to the head of the company such as the CEO, CTO, or chairman of the board.

For example, candidate viewer data repository 616 may include individual records corresponding to each contact within a company. Each contact record may include the contact's name and email address or other identifying information about the contact. Additionally, the contact record may include identifying information about a manager of the contact, and this manager identifying information may be used to construct a tree of contacts that represent an organizational hierarchy of a company. Higher levels in the organizational hierarchy (i.e., levels closer to the CEO, CTO, chairman of the board or other root node) represent larger teams, and lower levels in the organizational hierarchy (i.e., levels further from the CEO, CTO, chairman of the board or other root node and closer to leaf nodes or people with no reports) represent smaller teams.

Different content may be distributed to different teams of different granularities. For example, some content may be distributed to the entire company. Other content may be distributed to an entire team of a vice president, product manager, or other manager, as well as the teams of managers who report to that manager. Still other content may be distributed to individuals or an individual or organizationally flat team of a single manager that might not include any additional managers or teams within it. Depending on the content and the use case, all such teams may be identified from candidate viewer data repository 616 by identifying a lead person for whom information should be distributed to her or his entire team. If the lead person is higher level, the team receiving the information will be larger.

In one example, a team may be cut off so as to not include lower level reports on the team. For example, the team may be specified as all "direct reports" for a given manager, which does not include those contacts that report to the direct reports of the given manager. As another example, the team may be specified as all contacts that report up within two levels, or N levels, of the given manager. In the example of all contacts within two levels of the manager, the team may include contacts that report to the manager, and any contacts that report to those contacts but not any other contacts lower in the hierarchy. For all contacts within N levels, the team may include contacts that report to the manager, and other contacts and managers that report up to the manager up to N distance away from the manager in an organizational tree data structure.

Authenticating a User to an Individualized Audivisual Compilation Environment

Each contact may also be associated with authentication information and/or user profile information, which may be maintained together with team information in candidate viewer data repository 616 or separately in a user authentication data repository, which may also be hosted in the cloud. The authentication information and/or user profile information may indicate what objects and data the user can access once authenticated, and what public and/or private keys are used to authenticate the user to gain access to those objects and data. In one embodiment, a user is authenticated to each tool and service using an authentication cloud service, and stored user settings may be retrieved for the specific user from the cloud service. In another embodiment, the users are authenticated locally on a particular machine, and the stored settings are maintained on the machine itself.

Regardless of where the user settings are initially stored, once authenticated to audiovisual compilation tool 602, audiovisual compilation tool 602 gains access to stored user settings 612 of content orchestrator 604, which may be used to customize the compilation environment including the audiovisual content customization portal and/or the audiovisual content enrichment portal for content orchestrator 604. This customization may cause priority display, suggestion, listing, ordering, or use of frequently used information, teams, frequently used items of audiovisual content or combinations of items of audiovisual content or items or compilations created by originally created content orchestrator 604, frequently used categories of audiovisual content, frequently used feedback questions, frequently used graphical elements, frequently used backgrounds, and/or frequently used avatars, before less frequently used information. Information about a primary team of the content orchestrator 604 (for example, employees who report up to content orchestrator 604) may be used to suggest audiovisual content items and/or content categories for which the primary team is due to have training or for which the primary team has otherwise been identified as a target for the audiovisual content items.

Once candidate viewer 636 is authenticated to audiovisual viewer tool 628, audiovisual viewer tool 628 may gain access to stored user settings 634 for candidate viewer 636, which may be used to customize the playback environment including the personalized audiovisual content viewing portal for candidate viewer 636. This customization may cause priority display, suggestion, listing, ordering, or use of frequently used information audiovisual compilations, content categories for which audiovisual content is frequently consumed, and/or interface or content personalization based on user-specific location, user profile characteristics, or and/or date or time.

Once content provider 638 is authenticated to audiovisual content processing tool 640, content processing tool 640 may gain access to stored user settings of content provider 638, which may be used to customize the content processing environment for content provider 638. This customization may cause priority display, suggestion, listing, ordering, or use of audiovisual content items owned or originally uploaded by content provider 638, categories of audiovisual content items frequently uploaded by content provider 638, and/or audiovisual content items flagged as being needed specifically for a team of content provider 638, such as training needed by employees who report to content provider 638 in an organizational chart as indicated by candidate viewer data repository 616.

Audiovisual Content Customization Portal

Once items of audiovisual content have been labeled with content categories and marked name sections in block 104, process 100 continues in block 106 to receiving a request to generate a compilation of audiovisual content for a specified purpose and/or a specified team. The request may indicate a team of one specific candidate viewer of the audiovisual content, a team of multiple candidate viewers of the audiovisual content, or specific criteria to use for determining which candidate viewers should receive the audiovisual content. For example, the team may be identified as a Fusion product team, or as a team of people who report to John Smith within a company.

As shown in FIG. 6, content orchestrator 604 provides content orchestrator request 606 to audiovisual compilation tool 602. Content orchestrator request 606 may include information for identifying a team of people to each receive her or his own version of customized and personalized audiovisual content compilation 622. Content orchestrator request 606 may also include information for identifying a purpose of the customized and personalized audiovisual content item. For example, the request may be for "onboarding training," for "annual compliance training," or to "prepare for a conference." Audiovisual compilation tool 602 receives content orchestrator request 606 and processes the request using processors 608 operating according to stored instructions 610. Processing of the request may apply stored user settings 612 and select one or more items of audiovisual content for compilation according to item selection model 614.

Content orchestrator request 606 may be processed to extract information indicating a particular user, name, or role of a team within a company. Audiovisual compilation tool may use candidate viewer data structure 620, updated based on information from candidate viewer data repository 616, to determine which specific candidate viewers fall under the provided team identifying information. For example, candidate viewer data structure may be a tree structure, a lookup list, a relational database or view, or any other information based on candidate viewer data repository 616 that allows a team of candidate viewers to be determined from specified information. Audiovisual compilation tool 602 may use candidate viewer data structure to determine which manager(s) are within the team definition, how many levels of reports are included within the definition, and/or what role(s) or other characteristics (e.g., remote workers, engineers, sales personnel, newly hired employees, etc.) of employees or other contacts fall within the definition of the team.

Referring back to process 100 of FIG. 1, after receiving a request to generate a compilation of audiovisual content for a specified purpose and/or a specified team, the audiovisual compilation tool accesses a candidate viewer data structure to identify candidate viewers on the specified team in block 108. In block 110, the audiovisual compilation tool may further determine characteristics of the candidate viewers, whether or not such characteristics were among the characteristics used to initially define the candidate viewers in the received request from the content orchestrator. Based on the individual characteristics of members of the team, in block 112, the audiovisual compilation tool may determine aggregate characteristics of the specified team. For example, the audiovisual compilation tool may determine that the team includes a high percentage of remote workers, a high percentage of new employees, or a high percentage of employees who will be attending an upcoming conference. The audiovisual compilation tool may use the aggregate characteristics of the team in a selection process of block 114.

In block 114, process 100 includes selecting items of audiovisual content based on particular content categories associated with the specified purpose and/or the aggregate characteristics. Selecting items of audiovisual content associated with the specified purpose may be performed based on a machine learning model trained for selecting items of audiovisual content for a compilation based on a content orchestrator request. Referring to FIG. 6, processors 608 use item selection model 614 to process content orchestrator request 606 and determine customized and personalized audiovisual content compilation 622. Processors 608 also use candidate viewer data structure 620 to process content orchestrator request 606 and determine customized and personalized audiovisual content compilation 622. In other words, customized and personalized audiovisual content compilation 622 may be customized to select audiovisual content items that are appropriate for the specified purpose according to item selection model 614 and also audiovisual content items that are appropriate for the specified team according to candidate viewer data structure 620 and metadata included therein about the specified team.

Item selection model 614 may have access to an ontology of categories such as the ontology used by a content to category model used for initially detecting content categories in input audiovisual content. The ontology may map keyword clusters to corresponding categories such that keywords occurring in content orchestrator request may be mapped to corresponding categories with varying degrees of confidence. The item selection model may be used to detect the keywords in content orchestrator request 606 that most likely indicate unique categories of content desired in customized and personalized audiovisual content compilation 622, and include items in the corresponding categories when customizing the customized and personalized audiovisual content compilation 622. The item selection model may be trained on the level of overlap required between individual content categories from the ontology and words, phrases, or intents in the request, with the training data indicating that some keywords in some categories (i.e., "harassment" and "bribery") require little additional support to indicate a high likelihood that an audiovisual content item in a particular content category (in the example, "compliance" or "HR") is desired; whereas, other keywords in other categories (i.e., "sales" and "leads") require more support to indicate a high enough likelihood that an audiovisual content item in the particular content category (i.e., "sales" or "marketing") is desired.

Audiovisual compilation tool 602 may include an option for content orchestrator 604 to specify one or more explicit categories to be included when selecting audiovisual content items for the audiovisual content compilation (specified categories), and/or one or more natural phrase content indications that are mapped to content categories using item selection model 614 to be included when selecting audiovisual content items for the compilation (learned categories). Vector embeddings may be extracted from the text of content orchestrator request 606 based on the presence of intents or phrases uniquely associated with certain categories, how many separate details are provided in content orchestrator request 606, whether a statement specifying the purpose of the audiovisual compilation includes different words that could fit into the same category or whether the different words cannot fit into the same category, a minimum number of categories that can account for all words in the stated purpose, and a maximum number of categories that can account for all words in the stated purpose.

After audiovisual compilation tool selects items of audiovisual content for inclusion in the audiovisual content compilation, content orchestrator 604 may provide additional information about specific categories that are desired for inclusion in the audiovisual content compilation, or specific categories that were included that should be excluded from the audiovisual content compilation. This additional information may serve as feedback that the item selection model 614 either under-included items of audiovisual content by missing potentially relevant items, or over-included items of audiovisual content by including potentially irrelevant items. This feedback can be used to provide user-specific improvements by including or excluding these items initially in future requests from the same user, and/or to provide user-generic improvements by including or excluding these items initially in future requests from other users.

Item selection model 614 may be trained on thousands of items of audiovisual content such that patterns in the vector embeddings are determined and requests are better mapped to categories and corresponding audiovisual content items, iteratively improving with the training. For example, negative feedback such as over-inclusion or under-inclusion feedback mentioned above may be provided to iteratively improve item selection model 614. Positive feedback may be gathered due to the absence of negative feedback. For example, if item selection model 614 selects a proposed compilation of audiovisual content items, and content orchestrator 604 accepts the proposed compilation without adding or removing audiovisual content items from the mix, such feedback may serve to confirm that item selection model is performing well.

Item selection model 614 may also take into account categories that are associated with aggregate metadata about candidate viewers. For example, audiovisual compilation tool may suggest including audiovisual content items in a particular category, such as periodic compliance training, because a specified team has a high percentage of candidate viewers that would not have otherwise received the compliance training within the last period of time. As another example, audiovisual compilation tool may include a particular category of training that has been flagged for all groups of a certain type, such as engineering-type groups or sales-type groups, and the team qualifies as the certain type of group by having a high percentage of candidate viewers with certain characteristics, such as the characteristic of being engineers or sales personnel.

Figure 4:
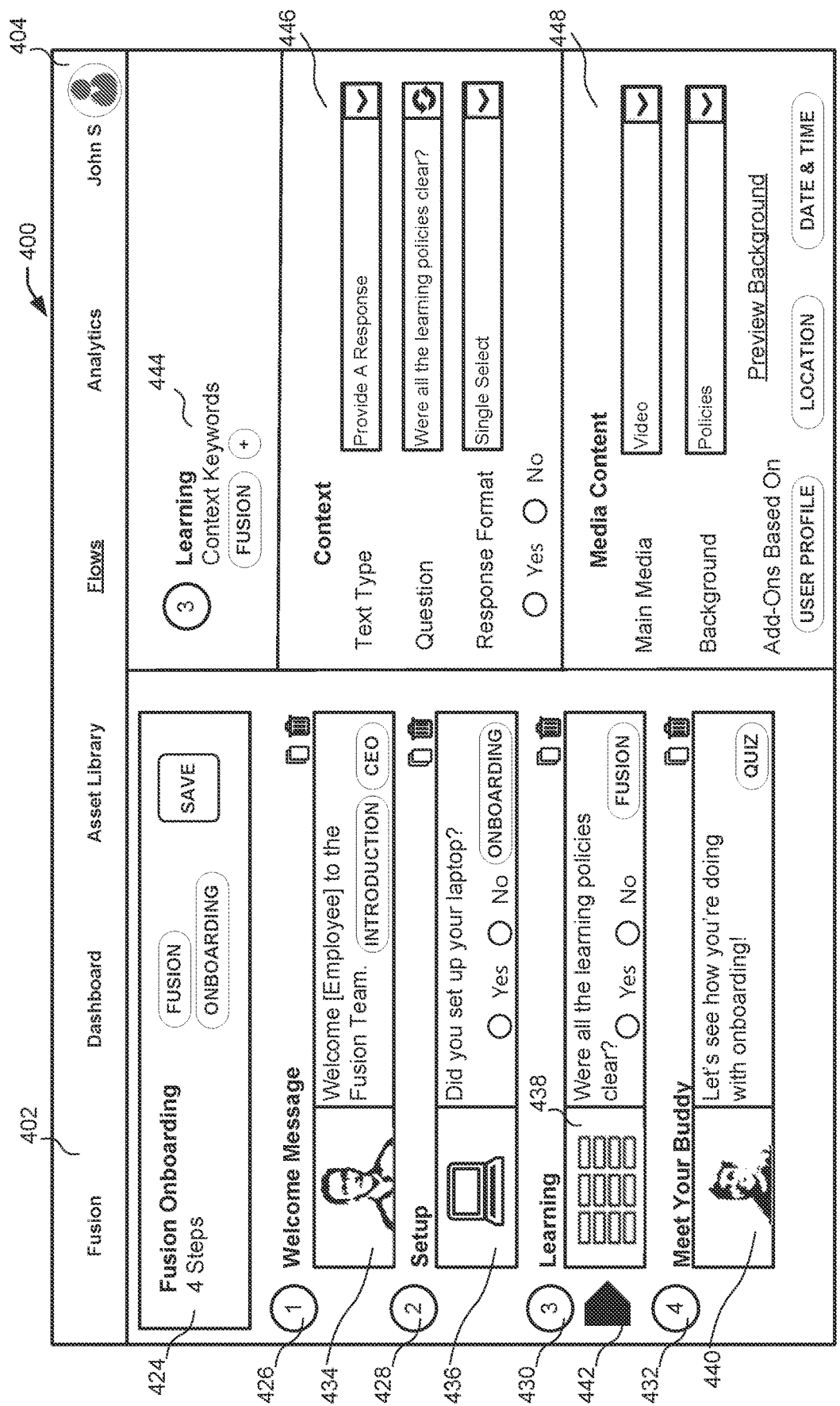
FIG. 4 illustrates an example view of an audiovisual content enrichment portal.

Item selection model 614 also determines an order of the selected audiovisual content items. The order may also be learned from positions that audiovisual content items typically have in finally published audiovisual content compilations, as well as keywords such as "introduction" and "setup," which should typically occur at or near the beginning of the compilation, and "conclusion," "next steps," or "meet your buddy," which might typically appear at or near the end of the compilation. The order can be modified on an audiovisual content enrichment interface, as shown in FIG. 4, and changes in ordering can provide negative feedback to the item selection model 614 for future ordering decisions. Similarly, publishing a compilation without changes can provide positive feedback for the item selection model 614 for future ordering decisions.

One or more machine learning models may be used to select the items of audiovisual content for the compilation. In one embodiment, a machine learning model is used for matching different purposes of a plurality of candidate purposes with different labeled audiovisual content items, at least in part by matching the specified purpose with at least one content label used to select audiovisual content item(s) for the compilation. In another embodiment, a machine learning model is used for matching different team characteristics of a plurality of candidate team characteristics with different labeled audiovisual content items, at least in part by matching the team characteristics with at least one content label used to select audiovisual content item(s) for the compilation. In yet another embodiment, a single machine learning model blends both the specified purpose and the team characteristics into a model for selecting audiovisual content item(s) for the compilation based on the relative importance of team characteristics and the specified purpose in a given item of orchestrator input.

Figure 2:
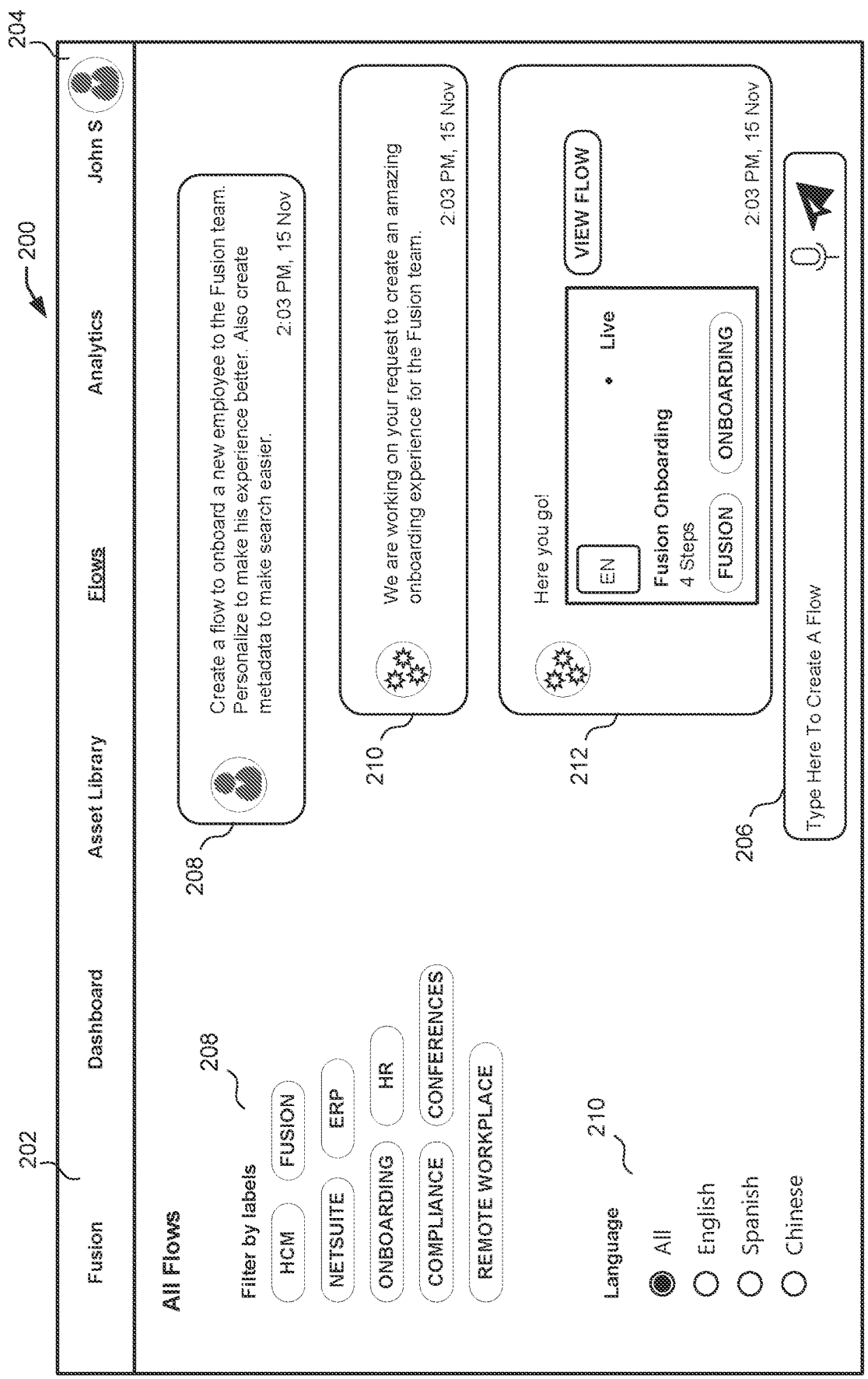
FIG. 2 illustrates an example chat view of an audiovisual content customization portal.

FIG. 2 illustrates an example chat view of an example audiovisual content customization portal 200. As shown, John S. has been authenticated to the audiovisual compilation tool as a content orchestrator and is shown in the user region 204 of status bar 202 as being logged in. The status bar 202 also shows different sub-interfaces of the audiovisual compilation tool, including a Dashboard interface, an Asset Library, Flows, and Analytics. The Flows sub-interface has been selected, which includes an explicit category selection region 208 for specifying certain categories or labels to be included in the compilation of audiovisual content items. As shown, example selectable categories may include HCM, Fusion, Netsuite, ERP, onboarding, HR, compliance, conferences, and remote workplace. Each of these categories may have corresponding audiovisual content items that are relevant to and labeled with the category.

Audiovisual content customization portal 200 also includes a language selection region 210, where a radio button or other user input may be selected to filter audiovisual content items to those that are offered in a particular language or multiple alternative languages. For example, a content orchestrator may wish to offer training to her/his team that is offered in different languages but otherwise contains the same substantive content. By selecting multiple languages in language selection region 210, the content orchestrator may narrow down results to those training options that are offered in the selected languages.

In the example shown, the content orchestrator typed a content orchestrator request into input box 206 at 2:03 pm on November 15. For example, the content orchestrator may type input into input box 206 and press the send button on the right, or press the microphone button and speak input into input box 206 before sending. As shown, the content orchestrator's request was inserted into a chat session as request 208, which reads: "Create a flow to onboard a new employee to the Fusion team. Personalize to make his experience better. Also create metadata to make search easier." The audiovisual compilation tool responded to the content orchestrator's request to indicate that request 208 was received and is being used to create an audiovisual compilation, in box 210 of the chat session. An item selection model of the audiovisual compilation tool may analyze request 208 to determine candidate viewers on the Fusion team as well as a purpose of request 208 relating to "Fusion" and "Onboarding" based on the text of request 208. Then, in box 212 of the chat session, the audiovisual compilation tool responds to request 208 by providing a 4-step Fusion Onboarding audiovisual compilation with the high-level categories of "Fusion" and "Onboarding." The 4-step audiovisual compilation may include audiovisual content items with other categories, which may or may not be indicated in the summary, and these other categories may include categories that were determined to be particularly relevant to the Fusion team based on aggregate characteristics of the Fusion team.

Figure 3:
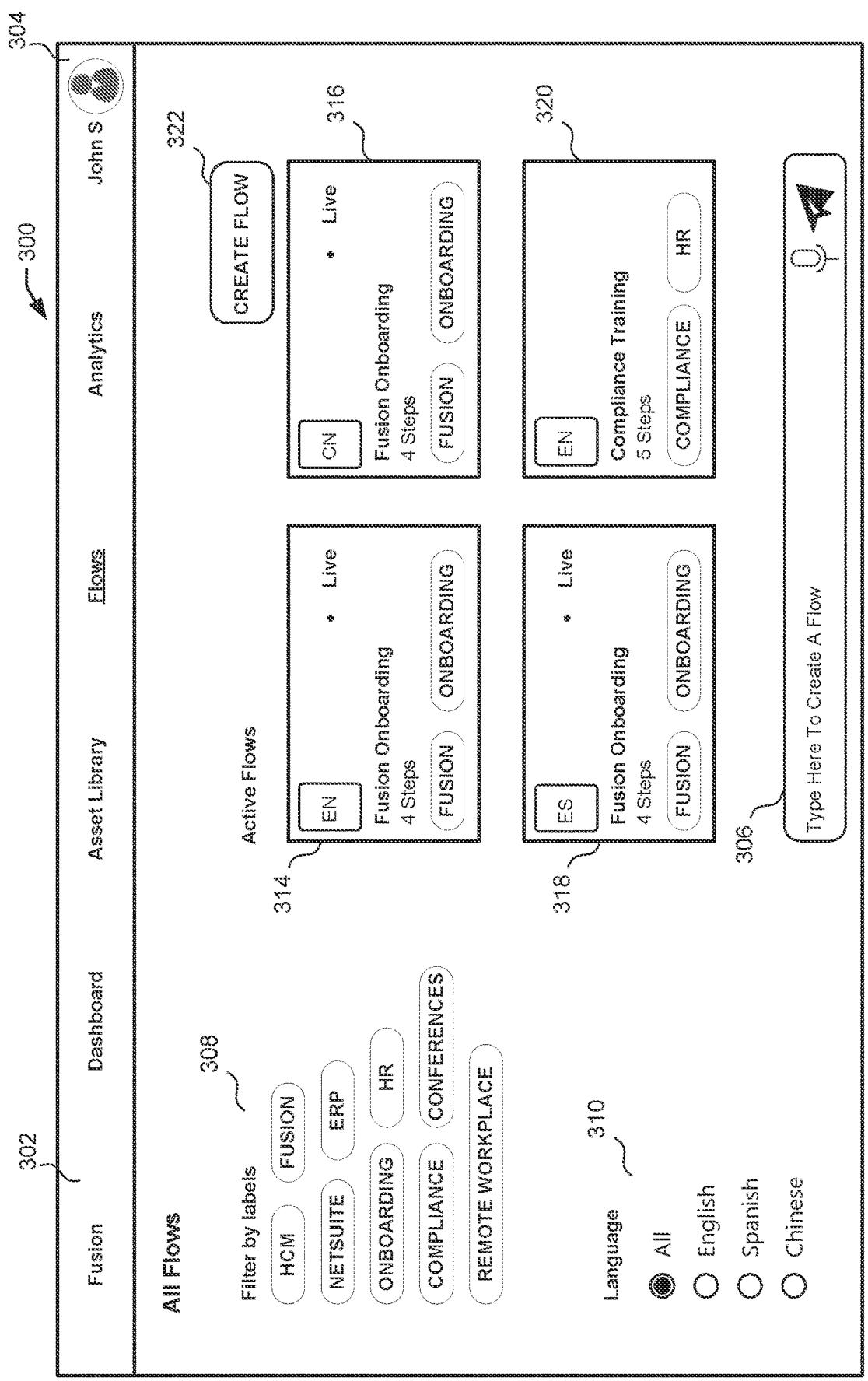
FIG. 3 illustrates an example flow browser view of an audiovisual content customization portal.

FIG. 3 illustrates an example flow browser view of an example audiovisual content customization portal 300. As shown, flow browser includes status bar 302 with various sub-interfaces of the audiovisual compilation tool and with John S. being logged in as indicated in user region 304. Categories are selectable in region 308 with languages selectable in region 310, each having the effect of filtering or focusing view on flows ("audiovisual content compilations") that match the selected criteria.

In an active flow region, active flows 314, 316, 318, and 320 are listed as flows the content orchestrator and/or others have already created. In this example, the content orchestrator can see the Fusion Onboarding audiovisual compilation in three different languages: English, Spanish, and Chinese, as well as an audiovisual compilation for compliance training in English. The content orchestrator has an option to create a new flow via input box 306 and/or create flow button 322. Create flow button 322 may pass the user to the example audiovisual content customization portal 200 with a chat interface or to another, more guided version of the audiovisual content customization portal.

Audiovisual Content Enrichment Portal

In the process of FIG. 1, optionally before or after personalization of the compilation in block 116, a determination is made in block 118 on whether an enrichment selection has been received. If there is no enrichment selection, process 100 ends with content customized and personalized as described with respect to blocks 102-116. If an enrichment selection has been made to add a question or a graphical element, process 100 continues to block 120 and/or 122, depending on which selection was made.

FIG. 4 illustrates an example view of an example audiovisual content enrichment portal 400. This interface may be viewed before an audiovisual content compilation has become active, or after the compilation has become active as a way of editing existing compilations. As shown, a status bar 402 is shown at the top, where user region 404 indicates John S. is authenticated as the content orchestrator of the audiovisual compilation tool. Flow summary bar 424 indicates which audiovisual content compilation is being reviewed and potentially modified in the interface. In this example, the Fusion Onboarding compilation is being reviewed, and this compilation has the high-level categories of Fusion and Onboarding, which may be a selected subset of categories of the audiovisual content items in the compilation, as well as lower-level categories for each of the individual audiovisual content items in the compilation. As shown, the audiovisual content compilation includes 4 items of audiovisual content 434, 436, 438, and 440, numbered with their corresponding order 426, 428, 430, and 432. Item 434 is a Welcome Message that welcomes an employee to the Fusion team. As shown, item 434 includes personalization by welcoming an employee by her/his name to the company. Such personalization can occur in text in the video as well as in replaced audio and/or video portions of the audiovisual content. Item 434 is labeled with "Introduction" and "CEO," indicating that item 434 should likely occur at the beginning of a compilation. As shown, item 434 appears first. The replaced audio name in item 434 may match the voice of the CEO or other speaker, as the audiovisual content is personalized. Each item 434, 436, 438, and 440 also includes icons for duplicating or deleting the item, as shown by the copy and trash icons to the upper right of each item 434, 436, 438, and 440.

Item 436 is a Setup item of audiovisual content that includes a feedback question, "Did you set up your laptop?" Such question may appear at the end or on a sidebar of the item of audiovisual content when played to a candidate viewer, and the question appears on the summary as shown to the content orchestrator, so the content orchestrator knows there is an opportunity to modify, add, or delete from the questions being asked. The feedback question is displayed to the candidate viewer when the item 436 is played to the candidate viewer, and a recordation of "Yes" or "No" is saved in a record of the candidate viewer's feedback of compilation 424. These records of feedback may be viewed in the analytics interface of the audiovisual compilation tool.

Item 438 is a Learning item of audiovisual content that similarly has a feedback question, "Were all the learning policies clear?" Such question may appear at the end or on a sidebar of the item of audiovisual content, similar to above with respect to item 436. The feedback is recorded as "Yes" or "No" for this question and is also saved in the record of the candidate viewer's feedback of compilation 424. This item of feedback may be viewed along with feedback on item 436 in the analytics interface of the audiovisual compilation tool.

Item 440 is a Meet Your Buddy item of audiovisual content that selects, for the candidate viewer of audiovisual content, a selected buddy that is similarly positioned in the organization and who also does not have an abundance of buddies, or based on other candidate viewer metadata from the candidate viewer repository or other candidate viewer data structure. Item 440 may mention the selected buddy by substituting the buddy's name in a placeholder location for buddy names in the meet your buddy video. Alternatively, inclusion of item 440 in the audiovisual compilation may prompt the selected buddy to upload a welcome video. The uploaded welcome video from the buddy may be included in the audiovisual compilation even if such video did not exist at the time of creation of the compilation by the content orchestrator. For example, the audiovisual compilation tool can send an email or other message to an email address or other contact of the buddy, and the message may include a link to the content storage and processing interface hosted by audiovisual content processing tool 640 of FIG. 6. The buddy may log into the tool, upload the requested video, and the requested video may immediately be included into the existing audiovisual compilation.

Audiovisual content enrichment portal 400 also includes an option for selecting an item for further modification. As shown, item 438 is selected as shown with graphical indicator 442. The selected item region 444 shows that the learning item has been selected and shows content keywords associated with the item along with options for adding new keywords associated with the item. Modifications to the selected content item may be in the form of adding questions, adding media content such as backgrounds, or adding graphical elements that appear with or over the content and provide additional functionality.

Customized Tracked Feedback Questions

Referring back to FIG. 1, if an enrichment selection is received to add a question, as determined in block 118, process 100 continues to block 120, where the audiovisual content is enriched with automatically generated tracked feedback questions.

To add, change, remove, or customize questions for a selected item of audiovisual content, audiovisual content enrichment portal 400 includes a context region 446. In context region 446, content orchestrator may add questions to the selected item of audiovisual content. As shown, the question may prompt the user for a response, which is then saved in a record of feedback for the audiovisual content compilation. The question that is asked to the user is automatically populated based on the content of the selected item. For example, a feedback question machine learning model may be trained on content of audiovisual content items to generate feedback questions relevant to the content of the audiovisual content items. When the user presses the refresh button to the right of the current question, "Were all the learning policies clear?", the feedback question model automatically generates a next most valid question after marking the previous question with the negative feedback provided by the refresh button. The audiovisual compilation tool offers the option of receiving user selections of different response formats, such as answering a "Yes" or "No" question, selecting from a bulleted list of items, checking a checkbox, or providing free-form text feedback.

In one embodiment, the feedback question model is trained on thousands of audiovisual content items where content orchestrators have added questions by cycling through automatically generated questions. The questions that were skipped are provided with negative feedback as associated with the vector embeddings representing the content of the selected audiovisual content item to be modified, and the questions that are ultimately included in the compilation and provided with positive feedback associated with the vector embeddings representing the content of the selected audiovisual content item to be modified. The vector embeddings may include information about the status of the speaker, the category of the content, unique factual information or unique details presented in the selected audiovisual content item compared to other audiovisual content items, the order of the audiovisual content item among the items in the compilation, other questions that were or were not already asked in other items of the compilation, and/or specific questions that are frequently asked by the content orchestrator. New questions may be added to the list of questions if the content orchestrator manually types in a question in context region 446 where the question is listed. This new question may begin to be tracked by feedback question model for the question's popularity in similar audiovisual content items appearing in compilations orchestrated by the same or different users.

In one embodiment, the audiovisual compilation tool transforms a selected item of the particular plurality of items of audiovisual content into a particular item of text content. Vector embedding(s) may be extracted from the particular item of text content and input to a machine learning model for generating a feedback question relevant to a corpus of text. For a particular feedback question generated by the machine learning model from the one or more vector embeddings, the audiovisual compilation tool displays, on a content enrichment interface, the particular feedback question and an option to add the particular feedback question to the selected item of audiovisual content. The option to add the particular feedback question to the selected item of audiovisual content, when selected, causes the audiovisual compilation tool to embed, in the selected item of audiovisual content, a script for handling an answer to the particular feedback question via a viewer interface by storing the answer, when provided, in a data structure modifiable by the viewer interface and accessible to the content enrichment interface. For example, the script may be embedded as JavaScript in a Web page for viewing the video, and the JavaScript may cause a reply to be stored in a relational database or other data structure, the stored data optionally triggering an email or some other communication to the candidate viewer outside of the viewer interface.

The questions may be refreshed using the machine learning model. The audiovisual compilation tool may display, on a content enrichment interface, a particular feedback question, an option to add the particular feedback question to the selected item of audiovisual content, and an option to change the particular feedback question. The option to change the particular feedback question, when selected, causes input of the vector embedding(s) and additional metadata to the machine learning model. The additional metadata indicates that the particular feedback question is not allowable output, or was negatively received by the content orchestrator. The machine learning model generates a new feedback question as a result. For the new feedback question, the audiovisual compilation tool causes display, on a content enrichment interface, of the new feedback question, an option to add the new feedback question to the selected item of audiovisual content, and an option to change the new feedback question. The new feedback question is different from the particular feedback question, and the feedback questions may continue to be changed in this manner until the content orchestrator is satisfied with the refreshed question.

Customized Additions of Graphical Elements

Referring back to FIG. 1, if a selection is received to add a graphical element, as determined in step 118, process 100 continues to step 122, where the audiovisual content is enriched with a graphical element, such as an overlayed or concurrently displayed graphical element, that triggers external functionality. Other media content and other graphical elements can also be added that change the look of the audiovisual content item but do not trigger external functionality.

To add, change, remove, or customize media content for a selected item of audiovisual content, audiovisual content enrichment portal 400 includes a media content region 448. Media content region 448 has an option for selecting which part of the audiovisual content item to add content to and what kind of content to add to that part. As shown, a personalized and customized background is being added to the main video. The personalized and customized background serves to replace a background already present in the main video, and the personalized and customized background takes into account the candidate viewer's user profile, location, and data and time when selecting the background. For example, nighttime for a first candidate viewer might occur during daytime of a second candidate viewer. If both viewers watch the video compilation at the same time, one compilation may have a background showing sunny skies, while another might have a background showing dark starry skies. As another example, one location might celebrate a regional holiday, such as U.S. Independence Day, while another region might celebrate a different regional holiday, such as Diwali. In one region, such as the U.S., near U.S. Independence Day, a red, white, and blue background may appear. In another region, such as India, near Diwali, the background may show lights in front of buildings. In yet another example, a user profile may indicate that a user is returning from vacation, in which case the background may show a tropical island. The "Preview Background" link may show the different backgrounds that appear in different scenarios for different users, and the variations may be shown in, for example, a pop-up window that shows the different image options for different times, locations, or profile characteristics, and allows the different image options to be changed or swapped out for other images by the content orchestrator.

Additional options that may be shown in media content region 448 include an option to specify a media content item or other graphical element to overlay or appear concurrently with the selected item of audiovisual content. This option may include a further option to identify target functionality the added graphical element should trigger when the graphical element is selected in a personalized audiovisual content viewing portal by the candidate viewer, for example, while the item of audiovisual content is playing to the candidate viewer. Example functionality includes sending an email matching an email template to the candidate viewer, storing the candidate viewer's name in a table of names that indicate which candidate viewers selected the graphical element, optionally timestamped based on when they selected the graphical element. The email or table of names could trigger further downstream functionality such as sending a reward item to the candidate viewer's physical address or email address, triggering a reward payment in the candidate viewer's payroll, and/or scheduling a meeting with the content orchestrator or another resource within the company. Information such as the email address of the candidate viewer may be retrieved from candidate viewer data repository 616.

Figure 5:
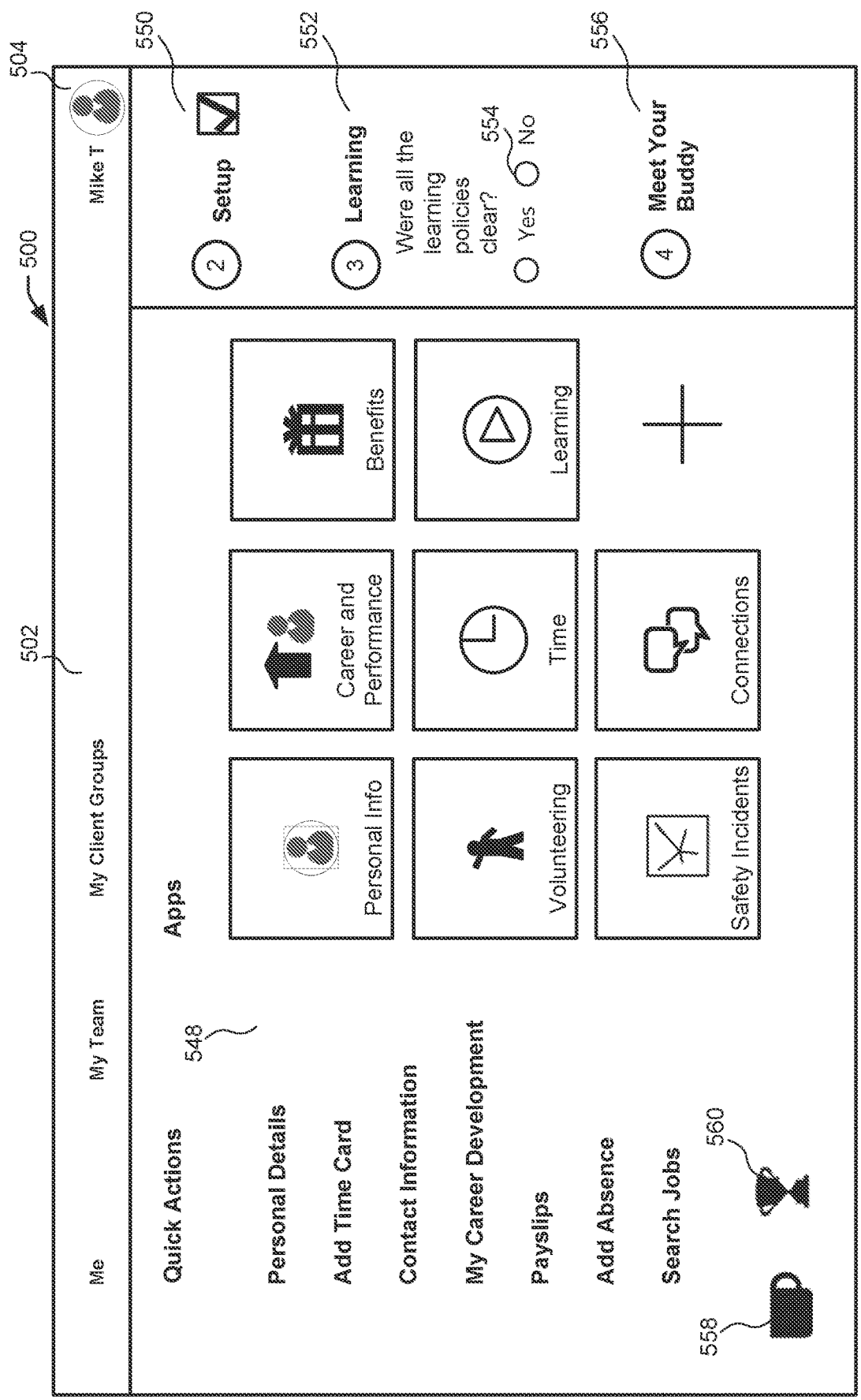
FIG. 5 illustrates an example view of a personalized audiovisual content viewing portal.

FIG. 5 illustrates an example view of a personalized audiovisual content viewing portal showing graphical elements 558 and 560 overlayed on or displayed concurrently with a training video 548. In one example, graphical elements 558 and/or 560 are displayed on top of the training video 548. In another example, graphical elements 558 and/or 560 are displayed in a bar under or beside training video 548. If the candidate viewer is watching and paying attention to the personalized audiovisual content, the candidate viewer may see an opportunity to select the coffee cup to receive an emailed gift certificate to a free cup of coffee at, for example, Starbucks®. Upon selection of the coffee cup, the audiovisual viewer tool 628 of FIG. 6 sends an available gift certificate code for Starbucks® to candidate viewer's email address as determined from candidate viewer data repository 616.

In another example, candidate viewer may see multiple trophies, gift boxes, or other prize-indicating graphical elements, along with a prompt to select one of the prize-indicating graphical elements. Upon selection of one of the prize-indicating graphical elements, the audiovisual viewer tool 628 of FIG. 6 determine which prize of a plurality of different prizes to grant to the candidate viewer, and delivers the prize to the candidate viewer at an email address or physical address as indicated in candidate viewer data repository 616.

In one embodiment, the audiovisual compilation tool uses a pre-trained large language model to generate graphical elements to be incorporated with the audiovisual content item. The audiovisual compilation tool displays, on a content enrichment interface, an option to modify visual content of a selected item of the particular plurality of items of audiovisual content according to given characteristic(s) associated with a given candidate viewer. The option to modify visual content, when selected, causes audiovisual compilation tool 602 to make a sample change to particular visual content of the particular item of audiovisual content for view in the content enrichment interface. The sample change allows the content orchestrator to see an example of what to expect in the compilation.

A prompt template is generated that, when applied to the given characteristic(s), transforms the given characteristic(s) into a prompt specific to the given characteristic(s). After the option to modify visual content is committed via the content enrichment interface, the audiovisual compilation tool stores the prompt template in association with customized and personalized audiovisual content compilation 622. When an individual candidate viewer is an active viewer in a viewer interface of audiovisual viewer tool 628, audiovisual viewer tool 628 may access a particular profile of the individual candidate viewer to determine particular characteristic(s) associated with the individual candidate viewer. For the active viewer, a particular prompt is generated specific to the candidate viewer based at least in part on the prompt template. The prompt template transforms the particular characteristic(s) to the particular prompt.

The audiovisual viewer tool 628 may input vector embedding(s) from candidate visual content, frame(s) of the candidate visual content, and the particular prompt, to a machine learning model for modifying the candidate visual content based on text prompts. Based on output from the machine learning model, the audiovisual viewer tool 628 may modify frame(s) of the candidate visual content. The modified frame(s) account for the particular characteristic(s) and may then be displayed in the viewer interface.

For example, the prompt template may be: "generate a background image for a candidate viewer who is enrolled in a [interest] class," where the [interest] placeholder is filled from a profile of the candidate viewer that indicates the candidate viewer is enrolled in a swimming class. Based on the prompt, the pre-trained large language model may generate a background that includes a picture of a calm ocean beach. The picture of the calm ocean beach may then be inserted as background into frames of a training video that otherwise has other background content.

In various other examples, information about the candidate viewer may be determined ahead-of-time by the audiovisual compilation tool 602, which may use the prompt template to generate prompts and incorporate images generated by a large language model into the audiovisual content before the audiovisual content is published or republished to published item repository 624 for consumption by audiovisual viewer tool 628 and ultimately candidate viewer 636. Such personalized content may be generated separately for separate users and stored as personalized segments in published item repository 624.

Artificially Intelligent Audiovisual Content Personalization

Once at least some items have been selected for the audiovisual compilation in block 114, process 100 continues in block 116 to personalize audiovisual content for a candidate viewer based on the marked name section(s) in the selected items of audiovisual content. A spoken name for each candidate viewer may be substituted in a version of the audiovisual content compilation that is specific to the candidate viewer. In one embodiment, the audiovisual content compilation is stored in segments to minimize the duplicative storage needed to store completely separate audiovisual content compilations for each candidate viewer. In this embodiment, segments of the audiovisual content compilation that do not include any personalization specific to the candidate viewer may be stored once for all candidate viewers, and segments of the audiovisual content compilation that do include personalization specific to the candidate viewer may be stored separately for each of the candidate viewers. A final audiovisual content compilation may be assembled from the segments for each candidate viewer based on the personalized and non-personalized segments as stored. The final audiovisual content compilation may be assembled and prepared as needed to buffer the audiovisual content ahead of a playback progress marker for viewing by audiovisual viewer tool 628 of FIG. 6, and to avoid choppiness due to the extra processing used to assemble the video.

As described above with respect to audiovisual content name marking model 642, audiovisual content may be marked and labeled when uploaded or later, synchronously or asynchronously, so the content may be selected for inclusion in customized and personalized audiovisual content compilation 622. Audiovisual compilation tool 602 customizes compilations by selecting labeled audiovisual content items from labeled audiovisual content item repository 618 that are appropriate for a specified purpose and/or a specified team.

Once audiovisual content items are selected for the compilation, the audiovisual content items may be personalized based on each specific candidate viewer for which customized and personalized audiovisual content compilation 622 is being created. Audiovisual personalization model 614 operates on audiovisual compilation tool 602 to adjust audiovisual content items according to different characteristics of different candidate viewers. In one embodiment, an audio section including spoken name is marked with a beginning time and an end time in an audiovisual content item retrieved from labeled audiovisual content item repository 618. The marked section is reserved for a candidate viewer's name and may include a placeholder name that was previously spoken. Volume, frequency, tone, and/or speed information may be obtained from the marked section based on a volume, frequency, tone, and/or speed of how a placeholder name was previously spoken in the marked section, and audiovisual personalization model may generate audio of a particular candidate viewer's name in a similar volume and/or frequency as the placeholder name was previously spoken.

The audiovisual personalization model may be trained on thousands of audiovisual content items to replace a placeholder name with a specific candidate name in a same voice, volume, frequency, tone, and speed as was originally spoken. The audiovisual personalization model may be graded in a training mode based on how seamless the replacement name was substituted for the placeholder name, with a higher score indicating a more seamless replacement. The audiovisual personalization model may optimize weights of vector embeddings from the marked section as originally provided and from a first-pass at a spoken replacement name to adjust volume, frequency, tone, and/or speed of the replacement name as spoken. The audiovisual personalization model may also adjust background noise in the marked section to match surrounding audio around the marked section, to provide a seamless transition between an audio section before the marked section and an audio section after the marked section. The voice and background may be smoothed at the edges of the marked section to avoid choppy edges that can otherwise occur with rough substitution of audio, and the audiovisual personalization model may also be graded separately on the choppiness of the substitution. Feedback to the audiovisual personalization model may be used to adjust how the vector embeddings are weighted and accounted for when modifying the audio to replace the placeholder name with the replacement name that is specific to the candidate viewer.

In one embodiment, the audio may be personalized by blending a marked section with its corresponding, surrounding, or otherwise marked-section-containing item of audiovisual content. Blending may include extracting a first set of vector embeddings that include section volume metric(s), section frequency metric(s), and/or section noise metric(s) from the marked section and a second set of vector embeddings that include item volume metric(s), item frequency metric(s), and item noise metric(s) from the containing item of audiovisual content. The blending further includes inputting the first set of vector embeddings, the second set of vector embeddings, and the marked section of audio content into a machine learning model for blending audio content with surrounding audio. Then, based on an output of the machine learning model, the blending includes modifying the marked section so at least one of the section volume metric(s), at least one of the section frequency metric(s), and/or at least one of the section noise metric(s) are more aligned with at least one of the item volume metric(s), at least one of the item frequency metric(s), and at least one of the item noise metric(s), respectively.

Referring back to FIG. 1, once the audiovisual content compilation has been customized, personalized, and/or enriched, process 100 concludes, and the audiovisual content compilation is ready for viewing by candidate viewer(s).

Personalized Audiovisual Content Viewing Portal

FIG. 5 illustrates an example view of a personalized audiovisual content viewing portal 500. As shown, personalized audiovisual content viewing portal 500 may include a header or status bar 502 that shows audiovisual content items for the team or client groups associated with the candidate viewer. In the example, Mike T is indicated in user region 504 as the candidate viewer viewing an item of audiovisual content about how to navigate applications and menu items available to employees. The main content of the item of audiovisual content is shown as a training video 548 in FIG. 5.

FIG. 5 also includes a sidebar, which may be expandable and collapsible. The sidebar includes information about which audiovisual content item the candidate viewer is actively viewing in region 552, along with the question 554 that may appear in the sidebar and/or at the end of the audiovisual content item. The sidebar also includes a region 550 showing an audiovisual content item already completed by the candidate viewer, indicated by the checkbox or other visual indication. Because the setup audiovisual content item is completed, region 550 may be collapsed to not show extra content such as questions or other content that may otherwise appear in the sidebar. Below regions 550 and 552 is region 556, which shows a next audiovisual content item that is due up for the candidate viewer. As shown, the Learning audiovisual content item currently being viewed is followed by the Meet Your Buddy audiovisual content item. A section for the Meet Your Buddy audiovisual content item may be expanded when the Meet Your Buddy audiovisual content item becomes an active audiovisual content item being viewed.

Computer System Architecture

Figure 7:
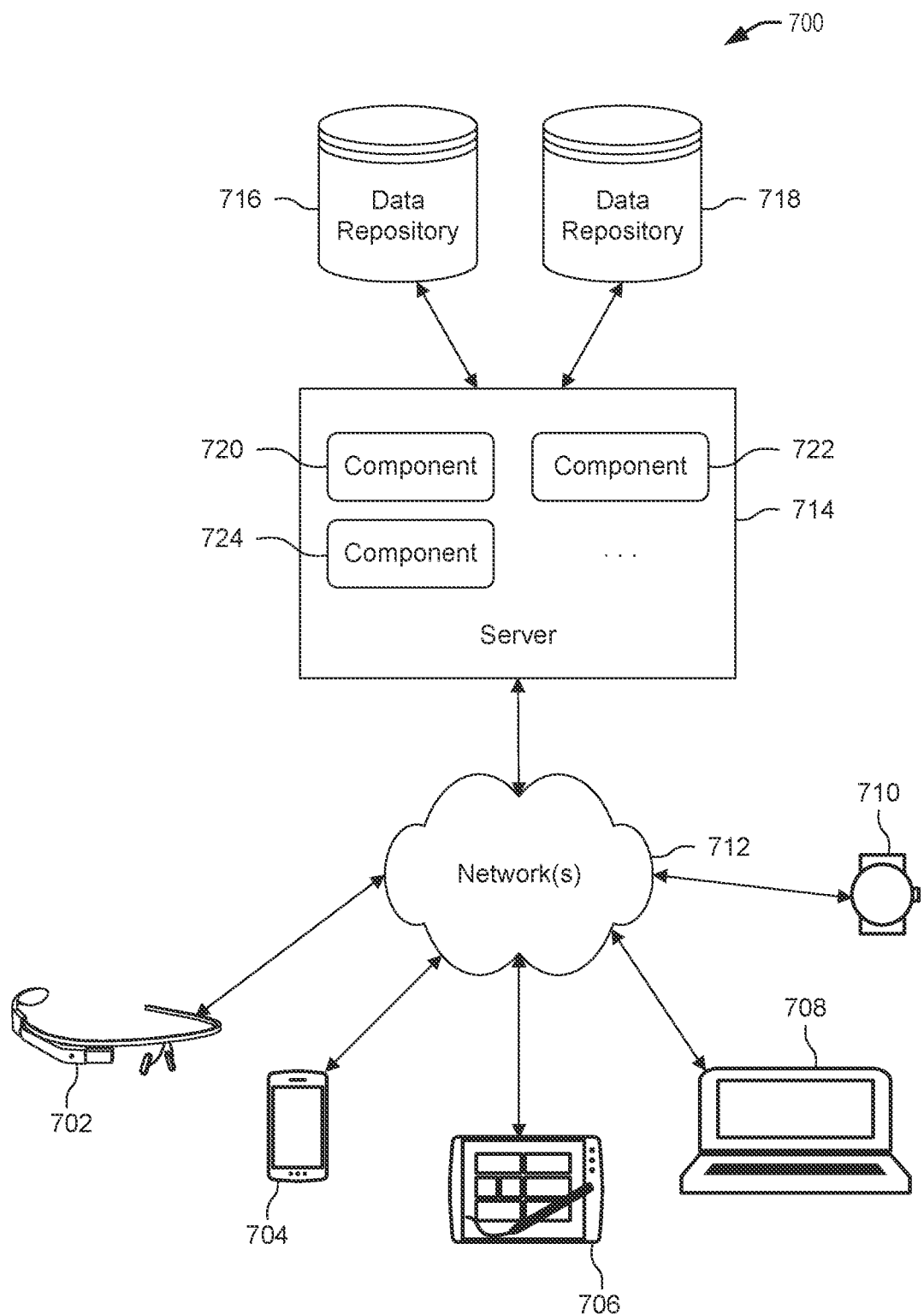
FIG. 7 depicts a simplified diagram of a distributed system for implementing certain aspects.

FIG. 7 depicts a simplified diagram of a distributed system 700 for implementing an embodiment. In the illustrated embodiment, distributed system 700 includes one or more client computing devices 702, 704, 706, 708, and/or 710 coupled to a server 714 via one or more communication networks 712. Clients computing devices 702, 704, 706, 708, and/or 710 may be configured to execute one or more applications.

In various aspects, server 714 may be adapted to run one or more services or software applications that enable techniques for customizing and personalizing audiovisual compilations.

In certain aspects, server 714 may also provide other services or software applications that can include non-virtual and virtual environments. In some aspects, these services may be offered as web-based or cloud services, such as under a Software as a Service (SaaS) model to the users of client computing devices 702, 704, 706, 708, and/or 710. Users operating client computing devices 702, 704, 706, 708, and/or 710 may in turn utilize one or more client applications to interact with server 714 to utilize the services provided by these components.

In the configuration depicted in FIG. 7, server 714 may include one or more components 720, 722 and 724 that implement the functions performed by server 714. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, 708, and/or 710 for techniques for customizing and personalizing audiovisual compilations in accordance with the teachings of this disclosure. A client device may provide an interface that enables a user of the client device to interact with the client device. The client device may also output information to the user via this interface. Although FIG. 7 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 712 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 712 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 714 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 714 can include one or more virtual machines running virtual operating systems, or other computing architectures involving virtualization such as one or more flexible pools of logical storage devices that can be virtualized to maintain virtual storage devices for the server. In various aspects, server 714 may be adapted to run one or more services or software applications that provide the functionality described in the foregoing disclosure.

The computing systems in server 714 may run one or more operating systems including any of those discussed above, as well as any commercially available server operating system. Server 714 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 714 may include one or more applications to analyze and consolidate data feeds and/or event updates received from users of client computing devices 702, 704, 706, 708, and/or 710. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 714 may also include one or more applications to display the data feeds and/or real-time events via one or more display devices of client computing devices 702, 704, 706, 708, and/or 710.

Distributed system 700 may also include one or more data repositories 716, 718. These data repositories may be used to store data and other information in certain aspects. For example, one or more of the data repositories 716, 718 may be used to store information for techniques for customizing and personalizing audiovisual compilations. Data repositories 716, 718 may reside in a variety of locations. For example, a data repository used by server 714 may be local to server 714 or may be remote from server 714 and in communication with server 714 via a network-based or dedicated connection. Data repositories 716, 718 may be of different types. In certain aspects, a data repository used by server 714 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 716, 718 may also be used by applications to store application data. The data repositories used by applications may be of different types such as, for example, a key-value store repository, an object store repository, or a general storage repository supported by a file system.

In one embodiment, server 714 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 8:
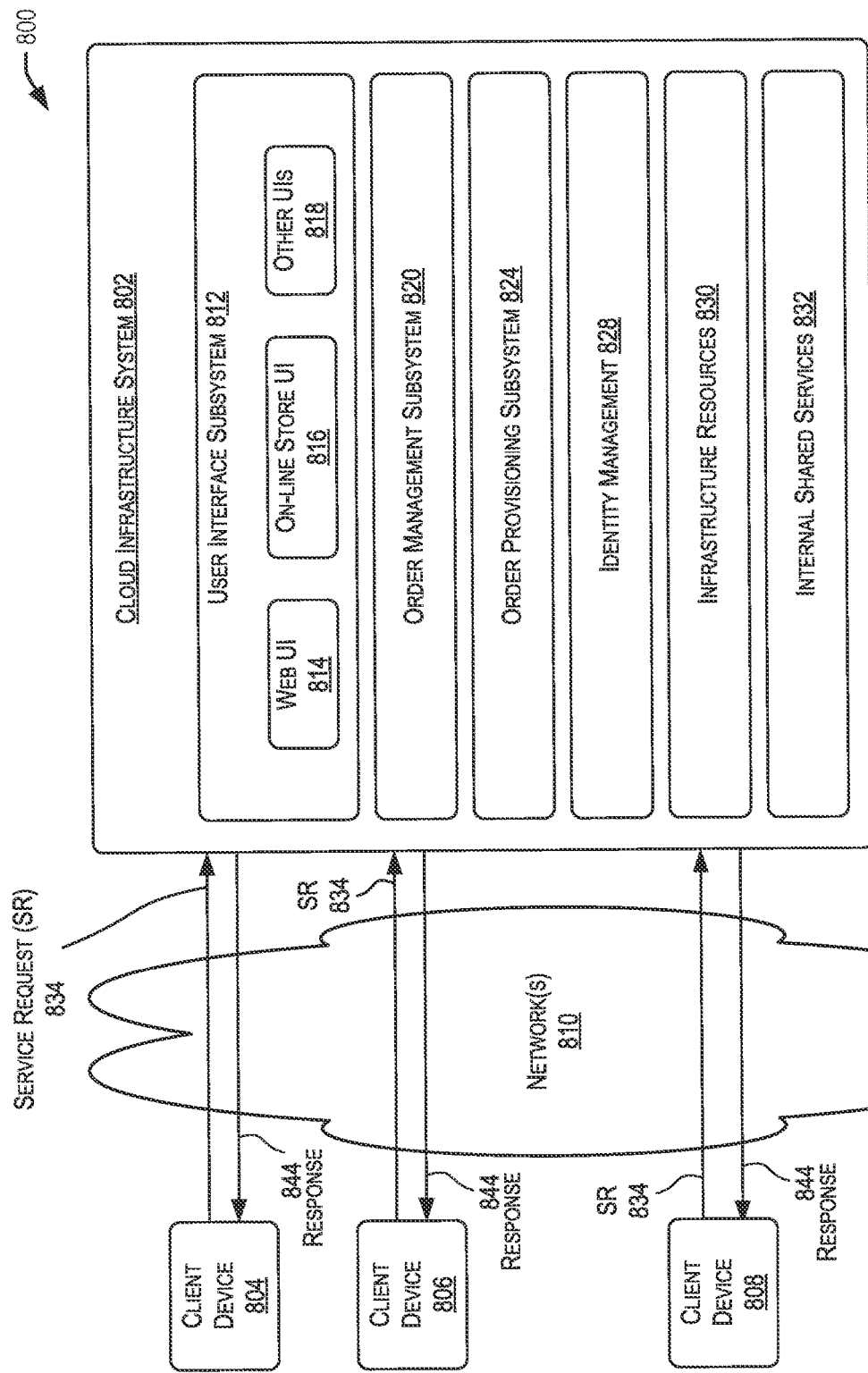
FIG. 8 is a simplified block diagram of one or more components of a system environment by which services provided by one or more components of an embodiment system may be offered as cloud services, in accordance with certain aspects.

In certain aspects, the techniques for customizing and personalizing audiovisual compilations functionalities described in this disclosure may be offered as services via a cloud environment. FIG. 8 is a simplified block diagram of a cloud-based system environment in which various text handling-related services may be offered as cloud services, in accordance with certain aspects. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other aspects, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative aspects.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 810 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as database services, middleware services, application services, and others.

In certain aspects, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 802. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

Cloud services are generally provided on an on-demand self-service basis, subscription-based, elastically scalable, reliable, highly available, and secure manner. For example, a tenant, via a subscription order, may order one or more services provided by cloud infrastructure system 802. Cloud infrastructure system 802 then performs processing to provide the services requested in the tenant's subscription order. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public tenant, where the tenant can be an individual or an enterprise. In certain other aspects, under a private cloud model, cloud infrastructure system 802 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request a chat bot service described in this disclosure.

In some aspects, the processing performed by cloud infrastructure system 802 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for determining the intent of an utterance. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain aspects, to facilitate efficient provisioning of these resources for supporting the various cloud services provided by cloud infrastructure system 802 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a tenant may, using a client device, request (service request 834) one or more services provided by cloud infrastructure system 802 using one or more of interfaces 814, 816, and 818. For example, a tenant may access the online store, browse cloud services offered by cloud infrastructure system 802, and place a subscription order for one or more services offered by cloud infrastructure system 802 that the tenant wishes to subscribe to. The service request may include information identifying the tenant and one or more services that the tenant desires to subscribe to. For example, a tenant may place a subscription order for a Chabot related service offered by cloud infrastructure system 802. As part of the order, the tenant may provide information identifying for input (e.g., utterances).

In certain aspects, such as the embodiment depicted in FIG. 8, cloud infrastructure system 802 may comprise an order management subsystem (OMS) 820 that is configured to process the new order. As part of this processing, OMS 820 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 802 may send a response or notification 744 to the requesting tenant to indicate when the requested service is now ready for use. In some instances, information (e.g., a link) may be sent to the tenant that enables the tenant to start using and availing the benefits of the requested services.

Cloud infrastructure system 802 may provide services to multiple tenants. For each tenant, cloud infrastructure system 802 is responsible for managing information related to one or more subscription orders received from the tenant, maintaining tenant data related to the orders, and providing the requested services to the tenant or clients of the tenant. Cloud infrastructure system 802 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 802 may provide services to multiple tenants in parallel. Cloud infrastructure system 802 may store information for these tenants, including possibly proprietary information. In certain aspects, cloud infrastructure system 802 comprises an identity management subsystem (IMS) 828 that is configured to manage tenant's information and provide the separation of the managed information such that information related to one tenant is not accessible by another tenant. IMS 828 may be configured to provide various security-related services such as identity services, such as information access management, authentication and authorization services, services for managing tenant identities and roles and related capabilities, and the like.

Figure 9:
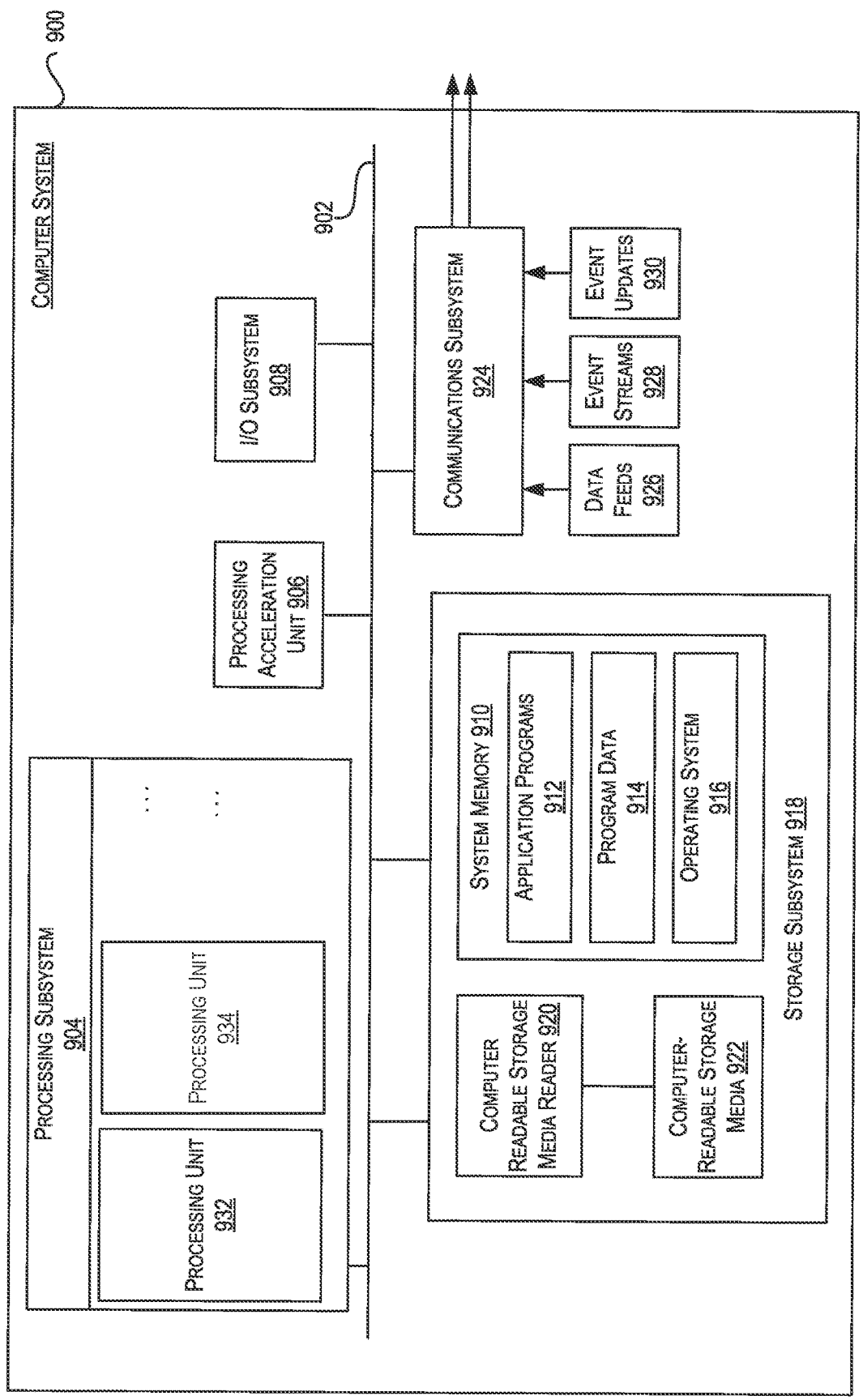
FIG. 9 illustrates an example computer system that may be used to implement certain aspects.

FIG. 9 illustrates an exemplary computer system 900 that may be used to implement certain aspects. For example, in some aspects, computer system 900 may be used to implement any of the system 100 for customizing and personalizing audiovisual compilations as shown in FIG. 1 and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some aspects, processing subsystem 904 can include one or more special purpose co-processors such as graphics processors, digital signal processors (DSPs), or the like. In some aspects, some or all of the processing units of processing subsystem 904 can be implemented using customized circuits, such as application specific integrated circuits (ASICs), or field programmable gate arrays (FPGAs).

In some aspects, the processing units in processing subsystem 904 can execute instructions stored in system memory 910 or on computer readable storage media 922. In various aspects, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain aspects, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some aspects. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android™ OS, BlackBerry® OS, Palm® OS operating systems, and others.

Computer-readable storage media 922 may store programming and data constructs that provide the functionality of some aspects. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, digital video disc (DVD), a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 918 may also include a computer-readable storage media reader 920 that can further be connected to computer-readable storage media 922. Reader 920 may receive and be configured to read data from a memory device such as a disk, a flash drive, etc.

In certain aspects, computer system 900 may support virtualization technologies, including but not limited to virtualization of processing and memory resources. For example, computer system 900 may provide support for executing one or more virtual machines. In certain aspects, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communication subsystem may be used to transmit a response to a user regarding the inquiry for a Chabot.

Communication subsystem 924 may support both wired and/or wireless communication protocols. For example, in certain aspects, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 902.XX family standards, or other mobile communication technologies, or any combination thereof), global positioning system (GPS) receiver components, and/or other components. In some aspects communications subsystem 924 can provide wired network connectivity (e.g., Ethernet) in addition to or instead of a wireless interface.

Communication subsystem 924 can receive and transmit data in various forms. For example, in some aspects, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter feeds, Facebook® updates, web feeds such as Rich Site Summary (RSS) feeds, and/or real-time updates from one or more third party information sources.

In certain aspects, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
storing a plurality of items of audiovisual content, wherein each item of audiovisual content of the plurality of items of audiovisual content is labeled with a content label of a plurality of content labels;
receiving a request to generate a compilation of audiovisual content for a specified purpose and a specified team;
analyzing a candidate viewer data structure to determine a plurality of candidate viewers on the specified team;
for each candidate viewer of the plurality of candidate viewers on the specified team, analyzing a profile of said candidate viewer to determine one or more characteristics of said candidate viewer;
aggregating the one or more characteristics of said each candidate viewer on the specified team to determine one or more team characteristics;
determining, from the plurality of content labels, a first set of one or more content labels associated with a specified purpose and a second set of one or more content labels associated with the one or more team characteristics;
selecting a particular plurality of items of audiovisual content for the compilation, wherein the particular plurality of items of audiovisual content comprise:
one or more items of audiovisual content having at least one content label of the first set of one or more content labels, and
one or more other items of audiovisual content having at least one content label of the second set of one or more content labels;
wherein a particular item of audiovisual content of the particular plurality of items of audiovisual content comprises a marked section of audio content reserved for a variable candidate viewer's audible name;
for a first candidate viewer of the plurality of candidate viewers on the specified team, automatically generating a first customized compilation based on the particular plurality of items, wherein the first customized compilation comprises a first customized version of the particular item of audiovisual content generated at least in part by:
substituting an audible name of the first candidate viewer as the variable candidate viewer's audible name in the marked section of audio content to generate a first marked section; and
blending the first marked section with the particular item of audiovisual content;
for a second candidate viewer of the plurality of candidate viewers on the specified team, automatically generating a second customized compilation based on the particular plurality of items, wherein the second customized compilation comprises a second customized version of the particular item of audiovisual content generated at least in part by:
  substituting an audible name of the second candidate viewer as the variable candidate viewer's audible name in the marked section of audio content to generate a second marked section; and
  blending the second marked section with the particular item of audiovisual content.

2. The computer-implemented method of claim 1, further comprising:
  receiving the particular item of audiovisual content without the marked section of audio content;
  transforming the particular item of audiovisual content into a particular item of text content;
  extracting one or more vector embeddings from the particular item of text content;
  inputting the one or more vector embeddings from the particular item of text content to a machine learning model for identifying a placeholder for a candidate viewer name in a corpus of text;
  for a particular placeholder identified by the machine learning model from the one or more vector embeddings, determining a corresponding start time and a corresponding end time in the particular item of audiovisual content;
  marking the particular item of audiovisual content based on the corresponding start time and the corresponding end time, resulting in the marked section of audio content reserved for the variable candidate viewer's audible name.

3. The computer-implemented method of claim 1, wherein said selecting the particular plurality of items of audiovisual content for the compilation is performed using a machine learning model for matching different purposes of a plurality of candidate purposes with different labeled audiovisual content items, at least in part by matching the specified purpose with at least one content label of the first set of one or more content labels.

4. The computer-implemented method of claim 1, wherein said selecting the particular plurality of items of audiovisual content for the compilation is performed using a machine learning model for matching different team characteristics of a plurality of candidate team characteristics with different labeled audiovisual content items, at least in part by matching the one or more team characteristics with at least one content label of the second set of one or more content labels.

5. The computer-implemented method of claim 1, wherein said blending the first marked section with the particular item of audiovisual content comprises:
  extracting a first set of vector embeddings comprising one or more section volume metrics, one or more section frequency metrics, and one or more section noise metrics from the first marked section and a second set of vector embeddings comprising one or more item volume metrics, one or more item frequency metrics, and one or more item noise metrics from the particular item of audiovisual content;
  inputting the first set of vector embeddings, the second set of vector embeddings, and the first marked section of audio content into a machine learning model for blending audio content with surrounding audio;
  based on an output of the machine learning model, modifying the first marked section so at least one of the one or more section volume metrics, at least one of the one or more section frequency metrics, and at least one of the one or more section noise metrics are more aligned with at least one of the one or more item volume metrics, at least one of the one or more item frequency metrics, and at least one of the one or more item noise metrics.

6. The computer-implemented method of claim 1, further comprising:
  transforming a selected item of the particular plurality of items of audiovisual content into a particular item of text content;
  extracting one or more vector embeddings from the particular item of text content;
  inputting the one or more vector embeddings from the particular item of text content to a machine learning model for generating a feedback question relevant to a corpus of text;
  for a particular feedback question generated by the machine learning model from the one or more vector embeddings, causing display, on a content enrichment interface, of the particular feedback question and an option to add the particular feedback question to the selected item of audiovisual content;
  wherein the option to add the particular feedback question to the selected item of audiovisual content, when selected, causes embedding, in the selected item of audiovisual content, a script for handling an answer to the particular feedback question via a viewer interface by storing the answer, when provided, in a data structure modifiable by the viewer interface and accessible to the content enrichment interface.

7. The computer-implemented method of claim 1, further comprising:
  transforming a selected item of the particular plurality of items of audiovisual content into a particular item of text content;
  extracting one or more vector embeddings from the particular item of text content;
  inputting the one or more vector embeddings from the particular item of text content to a machine learning model for generating a feedback question relevant to a corpus of text;
  for a particular feedback question generated by the machine learning model from the one or more vector embeddings, causing display, on a content enrichment interface, of the particular feedback question, an option to add the particular feedback question to the selected item of audiovisual content, and an option to change the particular feedback question;
  wherein the option to change the particular feedback question, when selected, causes input of the one or more vector embeddings and additional metadata to the machine learning model, the additional metadata indicating that the particular feedback question is not allowable output;
  for a new feedback question generated by the machine learning model from the one or more vector embeddings and the additional metadata, causing display, on a content enrichment interface, of the new feedback question, an option to add the new feedback question to the selected item of audiovisual content, and an option to change the new feedback question; wherein the new feedback question is different from the particular feedback question.

8. The computer-implemented method of claim 1, further comprising:
  causing display, on a content enrichment interface, of an option to modify visual content of a selected item of the particular plurality of items of audiovisual content according to one or more given characteristics associated with a given candidate viewer;

wherein the option to modify visual content, when selected, causes a sample change to particular visual content of the particular item of audiovisual content for view in the content enrichment interface;

generating a prompt template that, when applied to the one or more given characteristics, transforms the one or more given characteristics into a prompt specific to the one or more given characteristics;

wherein, after the option to modify visual content is committed via the content enrichment interface, the option further causes, when an individual candidate viewer is an active viewer in a viewer interface:

accessing a particular profile of the individual candidate viewer to determine one or more particular characteristics associated with the individual candidate viewer;

generating a particular prompt specific to the individual candidate viewer based at least in part on the prompt template, wherein the prompt template transforms the one or more particular characteristics to the particular prompt;

inputting one or more vector embeddings from candidate visual content, one or more frames of the candidate visual content, and the particular prompt, to a machine learning model for modifying the candidate visual content based on text prompts; and based on output from the machine learning model, modifying one or more frames of the candidate visual content, wherein the one or more modified frames account for the one or more particular characteristics;

causing display of the one or more modified frames in the viewer interface.

9. The computer-implemented method of claim 1, further comprising:

causing display, on a content enrichment interface, of an option to overlay interactive content on a selected item of the particular plurality of items of audiovisual content;

wherein the option to overlay interactive content, when selected, causes one or more graphical elements to appear on top of the selected item when the selected item is viewed by an active candidate viewer in a viewer interface;

wherein selection of a first graphical element of the one or more graphical elements, from the viewer interface, causes an operation to be performed outside of the viewer interface, and wherein the operation causes a downstream communication to the active candidate viewer outside of the viewer interface based at least in part on information from a particular profile of the active candidate viewer.

10. One or more non-transitory computer-readable media storing instructions which, when executed by one or more processors, cause:

storing a plurality of items of audiovisual content, wherein each item of audiovisual content of the plurality of items of audiovisual content is labeled with a content label of a plurality of content labels;

receiving a request to generate a compilation of audiovisual content for a specified purpose and a specified team;

analyzing a candidate viewer data structure to determine a plurality of candidate viewers on the specified team;

for each candidate viewer of the plurality of candidate viewers on the specified team, analyzing a profile of said candidate viewer to determine one or more characteristics of said candidate viewer;

aggregating the one or more characteristics of said each candidate viewer on the specified team to determine one or more team characteristics;

determining, from the plurality of content labels, a first set of one or more content labels associated with a specified purpose and a second set of one or more content labels associated with the one or more team characteristics;

selecting a particular plurality of items of audiovisual content for the compilation, wherein the particular plurality of items of audiovisual content comprise:

one or more items of audiovisual content having at least one content label of the first set of one or more content labels, and one or more other items of audiovisual content having at least one content label of the second set of one or more content labels;

wherein a particular item of audiovisual content of the particular plurality of items of audiovisual content comprises a marked section of audio content reserved for a variable candidate viewer's audible name;

wherein the instructions, when executed by the one or more processors, further cause:

for a first candidate viewer of the plurality of candidate viewers on the specified team, automatically generating a first customized compilation based on the particular plurality of items, wherein the first customized compilation comprises a first customized version of the particular item of audiovisual content generated at least in part by:

substituting an audible name of the first candidate viewer as the variable candidate viewer's audible name in the marked section of audio content to generate a first marked section; and blending the first marked section with the particular item of audiovisual content;

for a second candidate viewer of the plurality of candidate viewers on the specified team, automatically generating a second customized compilation based on the particular plurality of items, wherein the second customized compilation comprises a second customized version of the particular item of audiovisual content generated at least in part by:

substituting an audible name of the second candidate viewer as the variable candidate viewer's audible name in the marked section of audio content to generate a second marked section; and blending the second marked section with the particular item of audiovisual content.

11. The one or more non-transitory computer-readable media of claim 10, wherein the instructions, when executed by the one or more processors, further cause:

receiving the particular item of audiovisual content without the marked section of audio content;

transforming the particular item of audiovisual content into a particular item of text content;

extracting one or more vector embeddings from the particular item of text content;

inputting the one or more vector embeddings from the particular item of text content to a machine learning model for identifying a placeholder for a candidate viewer name in a corpus of text;

for a particular placeholder identified by the machine learning model from the one or more vector embeddings, determining a corresponding start time and a corresponding end time in the particular item of audiovisual content;

marking the particular item of audiovisual content based on the corresponding start time and the corresponding end time, resulting in the marked section of audio content reserved for the variable candidate viewer's audible name.

12. The one or more non-transitory computer-readable media of claim 10, wherein the instructions, when executed by the one or more processors, cause said selecting the particular plurality of items of audiovisual content for the compilation using a machine learning model for matching different purposes of a plurality of candidate purposes with different labeled audiovisual content items at least in part by matching the specified purpose with at least one content label of the first set of one or more content labels.

13. The one or more non-transitory computer-readable media of claim 10, wherein the instructions, when executed by the one or more processors, cause said selecting the particular plurality of items of audiovisual content for the compilation using a machine learning model for matching different team characteristics of a plurality of candidate team characteristics with different labeled audiovisual content items at least in part by matching the one or more team characteristics with at least one content label of the second set of one or more content labels.

14. The one or more non-transitory computer-readable media of claim 10, wherein the instructions, when executed by the one or more processors, further cause:
transforming a selected item of the particular plurality of items of audiovisual content into a particular item of text content;
extracting one or more vector embeddings from the particular item of text content;
inputting the one or more vector embeddings from the particular item of text content to a machine learning model for generating a feedback question relevant to a corpus of text;
for a particular feedback question generated by the machine learning model from the one or more vector embeddings, causing display, on a content enrichment interface, of the particular feedback question and an option to add the particular feedback question to the selected item of audiovisual content;
wherein the option to add the particular feedback question to the selected item of audiovisual content, when selected, causes embedding, in the selected item of audiovisual content, a script for handling an answer to the particular feedback question via a viewer interface by storing the answer, when provided, in a data structure modifiable by the viewer interface and accessible to the content enrichment interface.

15. The one or more non-transitory computer-readable media of claim 10, wherein the instructions, when executed by the one or more processors, further cause:
causing display, on a content enrichment interface, of an option to modify visual content of a selected item of the particular plurality of items of audiovisual content according to one or more given characteristics associated with a given candidate viewer;
wherein the option to modify visual content, when selected, causes a sample change to particular visual content of the particular item of audiovisual content for view in the content enrichment interface;
generating a prompt template that, when applied to the one or more given characteristics, transforms the one or more given characteristics into a prompt specific to the one or more given characteristics;
wherein, after the option to modify visual content is committed via the content enrichment interface, the option further causes, when an individual candidate viewer is an active viewer in a viewer interface:
accessing a particular profile of the individual candidate viewer to determine one or more particular characteristics associated with the individual candidate viewer;
generating a particular prompt specific to the individual candidate viewer based at least in part on the prompt template, wherein the prompt template transforms the one or more particular characteristics to the particular prompt;
inputting one or more vector embeddings from candidate visual content, one or more frames of the candidate visual content, and the particular prompt, to a machine learning model for modifying the candidate visual content based on text prompts; and
based on output from the machine learning model, modifying one or more frames of the candidate visual content, wherein the one or more modified frames account for the one or more particular characteristics;
causing display of the one or more modified frames in the viewer interface.

16. A system comprising:
a cloud storage repository that stores a plurality of items of audiovisual content, wherein each item of audiovisual content of the plurality of items of audiovisual content is labeled with a content label of a plurality of content labels;
one or more processors;
one or more non-transitory computer-readable media storing instructions which, when executed by the one or more processors, cause:
receiving a request to generate a compilation of audiovisual content for a specified purpose and a specified team;
analyzing a candidate viewer data structure to determine a plurality of candidate viewers on the specified team;
for each candidate viewer of the plurality of candidate viewers on the specified team, analyzing a profile of said candidate viewer to determine one or more characteristics of said candidate viewer;
aggregating the one or more characteristics of said each candidate viewer on the specified team to determine one or more team characteristics;
determining, from the plurality of content labels, a first set of one or more content labels associated with a specified purpose and a second set of one or more content labels associated with the one or more team characteristics;
selecting a particular plurality of items of audiovisual content for the compilation, wherein the particular plurality of items of audiovisual content comprise:
one or more items of audiovisual content having at least one content label of the first set of one or more content labels, and
one or more other items of audiovisual content having at least one content label of the second set of one or more content labels;

wherein a particular item of audiovisual content of the particular plurality of items of audiovisual content comprises a marked section of audio content reserved for a variable candidate viewer's audible name;

wherein the instructions, when executed by the one or more processors, further cause:

for a first candidate viewer of the plurality of candidate viewers on the specified team, automatically generating a first customized compilation based on the particular plurality of items, wherein the first customized compilation comprises a first customized version of the particular item of audiovisual content generated at least in part by:

substituting an audible name of the first candidate viewer as the variable candidate viewer's audible name in the marked section of audio content to generate a first marked section; and blending the first marked section with the particular item of audiovisual content;

for a second candidate viewer of the plurality of candidate viewers on the specified team, automatically generating a second customized compilation based on the particular plurality of items, wherein the second customized compilation comprises a second customized version of the particular item of audiovisual content generated at least in part by:

substituting an audible name of the second candidate viewer as the variable candidate viewer's audible name in the marked section of audio content to generate a second marked section; and blending the second marked section with the particular item of audiovisual content.

17. The system of claim 16, further comprising:

one or more non-transitory computer-readable storage media storing further instructions and an audiovisual content name marking model, the further instructions, when executed by the one or more processors, further cause:

receiving the particular item of audiovisual content without the marked section of audio content;

transforming the particular item of audiovisual content into a particular item of text content;

extracting one or more vector embeddings from the particular item of text content;

inputting the one or more vector embeddings from the particular item of text content to the audiovisual content name marking model for identifying a placeholder for a candidate viewer name in a corpus of text;

for a particular placeholder identified by the audiovisual content name marking model, determining a corresponding start time and a corresponding end time in the particular item of audiovisual content;

marking the particular item of audiovisual content based on the corresponding start time and the corresponding end time, resulting in the marked section of audio content reserved for the variable candidate viewer's audible name.

18. The system of claim 16, wherein the one or more non-transitory computer-readable storage media store a machine learning model and instructions which, when executed by the one or more processors, cause said selecting the particular plurality of items of audiovisual content for the compilation using the machine learning model for matching different purposes of a plurality of candidate purposes with different labeled audiovisual content items at least in part by matching the specified purpose with at least one content label of the first set of one or more content labels.

19. The system of claim 16, wherein the one or more non-transitory computer-readable storage media store a machine learning model and instructions which, when executed by the one or more processors, cause said selecting the particular plurality of items of audiovisual content for the compilation using the machine learning model for matching different team characteristics of a plurality of candidate team characteristics with different labeled audiovisual content items at least in part by matching the one or more team characteristics with at least one content label of the second set of one or more content labels.

20. The system of claim 16, wherein the one or more non-transitory computer-readable storage media store a feedback question machine learning model and instructions which, when executed by the one or more processors, further cause:

transforming a selected item of the particular plurality of items of audiovisual content into a particular item of text content;

extracting one or more vector embeddings from the particular item of text content;

inputting the one or more vector embeddings from the particular item of text content to the feedback question machine learning model for generating a feedback question relevant to a corpus of text;

for a particular feedback question generated by the feedback question machine learning model from the one or more vector embeddings, causing display, on a content enrichment interface, of the particular feedback question and an option to add the particular feedback question to the selected item of audiovisual content;

wherein the option to add the particular feedback question to the selected item of audiovisual content, when selected, causes embedding, in the selected item of audiovisual content, a script for handling an answer to the particular feedback question via a viewer interface by storing the answer, when provided, in a data structure modifiable by the viewer interface and accessible to the content enrichment interface.

\* \* \* \* \*